US012405378B2

(12) United States Patent
Boloorian et al.

(10) Patent No.: US 12,405,378 B2
(45) Date of Patent: Sep. 2, 2025

(54) USE OF FREQUENCY OFFSETS IN GENERATION OF LIDAR DATA

(71) Applicant: SiLC Technologies, Inc., Monrovia, CA (US)

(72) Inventors: Majid Boloorian, San Diego, CA (US); Mehdi Asghari, La Canada Flintridge, CA (US); Dazeng Feng, El Monte, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 0 days.

(21) Appl. No.: 18/125,713

(22) Filed: Mar. 23, 2023

(65) Prior Publication Data

US 2023/0251378 A1    Aug. 10, 2023

Related U.S. Application Data

(63) Continuation of application No. 16/542,648, filed on Aug. 16, 2019, now Pat. No. 11,650,317, which is a
(Continued)

(51) Int. Cl.
*G01S 17/34*     (2020.01)
*G01S 7/4913*    (2020.01)

(52) U.S. Cl.
CPC ............ *G01S 17/34* (2020.01); *G01S 7/4913* (2013.01)

(58) Field of Classification Search
CPC ...... G01S 17/32; G01S 7/4814; G01S 7/4817; G01S 17/931; G01S 7/4914; G01S 17/42;
(Continued)

(56) References Cited

U.S. PATENT DOCUMENTS 4,262,993 A    4/1981   Burns et al.
4,523,803 A    6/1985   Arao et al.
(Continued)

FOREIGN PATENT DOCUMENTS

CN       1668939 A    9/2005
CN    101356450 A    1/2009
(Continued)

OTHER PUBLICATIONS

"The Demultiplexer" accessed from www.electronics-tutorials.ws/combination/comb_3.html with WayBack Machine dated Feb. 9, 2008, 2 pages.
(Continued)

*Primary Examiner* — Hwa Andrew Lee
(74) *Attorney, Agent, or Firm* — Gavrilovich, Dodd & Lindsey LLP

(57) ABSTRACT

A LIDAR system includes a light source that outputs an outgoing LIDAR signal that includes multiple different channels. The LIDAR system also generate multiple composite light signals that each carries a signal couple and are each associated with a different one of the channels. A signal couple includes a reference signal and an associated comparative signal. The comparative signals each include light from the outgoing LIDAR signal that has been reflected by one or more objects located outside of the LIDAR system. The reference signals also include light from the outgoing LIDAR signal but also exclude light that has been reflected by any object located outside of the LIDAR system. There is a frequency differential between a frequency of the reference signal and a frequency of the associated comparative signal. The frequency differential includes a contribution from a frequency offset that is induced by electronics. The electronics induce the frequency offset such that the frequency offset is different for each signal couple.

8 Claims, 10 Drawing Sheets

Related U.S. Application Data continuation-in-part of application No. 16/457,443, filed on Jun. 28, 2019, now abandoned.

(58) Field of Classification Search
CPC ...... G01S 7/4816; G01S 7/4818; G01S 17/34; G01S 17/58; G01S 7/4815
See application file for complete search history.

(56) References Cited

U.S. PATENT DOCUMENTS

| | | |
|---|---|---|
| 4,786,132 A | 11/1988 | Gordon |
| 4,845,703 A | 7/1989 | Suzuki |
| 4,914,665 A | 4/1990 | Sorin |
| 4,955,028 A | 9/1990 | Alferness et al. |
| 4,987,832 A | 1/1991 | Klink et al. |
| 4,995,720 A | 2/1991 | Amzajerdian |
| 5,041,832 A | 8/1991 | Gulczynski |
| 5,194,906 A | 3/1993 | Kimura et al. |
| 5,289,252 A | 2/1994 | Nourrcier |
| 5,323,223 A | 6/1994 | Hayes |
| 5,396,328 A | 3/1995 | Jestel et al. |
| 5,847,816 A | 12/1998 | Zediker et al. |
| 5,889,490 A | 3/1999 | Wachter et al. |
| 5,953,468 A | 9/1999 | Finnila et al. |
| 5,977,538 A | 11/1999 | Unger et al. |
| 5,995,810 A | 11/1999 | Karasawa |
| 6,035,083 A | 3/2000 | Brennan, III et al. |
| 6,040,898 A | 3/2000 | Mrosik et al. |
| 6,108,472 A | 8/2000 | Rickman et al. |
| 6,400,500 B1 | 6/2002 | Tidmarsh et al. |
| 6,480,513 B1 | 11/2002 | Kapany et al. |
| 6,556,759 B2 | 4/2003 | Roberts et al. |
| 6,567,573 B1 | 5/2003 | Domash et al. |
| 6,687,010 B1 | 2/2004 | Horii et al. |
| 6,921,490 B1 | 7/2005 | Qian et al. |
| 6,970,621 B1 | 11/2005 | Fried |
| 6,977,502 B1 | 12/2005 | Hertz |
| 7,345,744 B2 | 3/2008 | Halmos et al. |
| 7,375,877 B1 | 5/2008 | Di Teodoro et al. |
| 7,535,390 B2 | 5/2009 | Hsu |
| 7,907,333 B2 | 3/2011 | Coyle |
| 8,165,433 B2 | 4/2012 | Jenkins et al. |
| 8,213,751 B1 | 7/2012 | Ho et al. |
| 8,311,374 B2 | 11/2012 | Hochberg et al. |
| 8,326,100 B2 | 12/2012 | Chen et al. |
| 8,410,566 B2 | 4/2013 | Qian et al. |
| 8,541,744 B1 | 9/2013 | Liu |
| 8,558,993 B2 | 10/2013 | Newbury et al. |
| 8,885,678 B1 | 11/2014 | Kupershmidt |
| 9,157,790 B2 | 10/2015 | Shpunt et al. |
| 9,176,282 B2 | 11/2015 | Pottier et al. |
| 9,235,097 B2 | 1/2016 | Meade et al. |
| 9,310,471 B2 | 4/2016 | Sayyah et al. |
| 9,310,487 B2 | 4/2016 | Sakimura et al. |
| 9,519,052 B2 | 12/2016 | Gusev |
| 9,575,341 B2 | 2/2017 | Heck et al. |
| 9,606,234 B2 | 3/2017 | Major, Jr. et al. |
| 9,625,580 B2 | 4/2017 | Kotelnikov et al. |
| 9,735,885 B1 | 8/2017 | Sayyah et al. |
| 9,740,079 B1 | 8/2017 | Davids et al. |
| 9,748,726 B1 | 8/2017 | Morton et al. |
| 9,753,351 B2 | 9/2017 | Eldada |
| 9,778,363 B2 | 10/2017 | Kadambi et al. |
| 9,798,166 B1 | 10/2017 | Sharma et al. |
| 9,823,118 B2 | 11/2017 | Doylend et al. |
| 9,841,495 B2 | 12/2017 | Campbell et al. |
| 9,851,443 B2 | 12/2017 | Chen |
| 9,857,468 B1 | 1/2018 | Eichenholz et al. |
| 9,893,737 B1 | 2/2018 | Keramat et al. |
| 10,003,168 B1 | 6/2018 | Villeneuve |
| 10,007,060 B1 | 6/2018 | Qian et al. |
| 10,094,916 B1 | 10/2018 | Droz et al. |
| 10,137,903 B2 | 11/2018 | Tascione et al. |
| 10,222,474 B1 | 3/2019 | Raring et al. |
| 10,274,599 B2 | 4/2019 | Schmalenberg |
| 10,281,322 B2 | 5/2019 | Doylend et al. |
| 10,345,447 B1 | 7/2019 | Hicks |
| 10,397,019 B2 | 8/2019 | Hartung et al. |
| 10,564,268 B2 | 2/2020 | Turbide et al. |
| 10,605,901 B2 | 3/2020 | Lee et al. |
| 10,627,496 B2 | 4/2020 | Schmalenberg et al. |
| 10,739,256 B1 | 8/2020 | Rickman et al. |
| 10,761,195 B2 | 9/2020 | Donovan |
| 10,782,782 B1 | 9/2020 | DeSalvo et al. |
| 10,788,582 B2 | 9/2020 | Feng et al. |
| 10,816,649 B1 | 10/2020 | Keyser et al. |
| 10,845,480 B1 | 11/2020 | Shah et al. |
| 10,901,074 B1 | 1/2021 | Pan et al. |
| 11,022,683 B1 | 6/2021 | Rezk |
| 11,067,668 B1 | 7/2021 | Bravo |
| 11,114,815 B1 | 9/2021 | Chen et al. |
| 11,119,219 B1 | 9/2021 | LaChapelle et al. |
| 11,162,789 B2 | 11/2021 | Lodin et al. |
| 11,170,476 B1 | 11/2021 | Toshniwal et al. |
| 11,175,388 B1 | 11/2021 | Wood et al. |
| 11,221,404 B1 | 1/2022 | DeSalvo et al. |
| 11,300,683 B2 | 4/2022 | Bao et al. |
| 11,378,691 B2 | 7/2022 | Boloorian et al. |
| 11,448,729 B2 | 9/2022 | Baba et al. |
| 11,454,724 B2 | 9/2022 | Michaels et al. |
| 11,486,975 B1 | 11/2022 | Xiao |
| 11,493,753 B1 | 11/2022 | Wood et al. |
| 11,525,916 B2 | 12/2022 | Avci et al. |
| 11,536,805 B2 | 12/2022 | Asghari et al. |
| 11,579,300 B1 | 2/2023 | Li |
| 11,635,491 B2 | 4/2023 | Asghari et al. |
| 11,714,167 B2 | 8/2023 | Feng et al. |
| 11,815,720 B1 | 11/2023 | Tavallaee et al. |
| 2002/0031304 A1 | 3/2002 | Roberts et al. |
| 2002/0105632 A1 | 8/2002 | Holton |
| 2002/0122398 A1 | 9/2002 | Jou |
| 2002/0159700 A1 | 10/2002 | Coroy et al. |
| 2003/0030582 A1 | 2/2003 | Vickers |
| 2003/0031407 A1 | 2/2003 | Weisberg et al. |
| 2003/0142943 A1 | 7/2003 | Yegnanarayanan et al. |
| 2003/0212520 A1 | 11/2003 | Campos et al. |
| 2003/0231686 A1 | 12/2003 | Liu |
| 2004/0081388 A1 | 4/2004 | Koyama |
| 2004/0085612 A1 | 5/2004 | Livingston et al. |
| 2004/0233964 A1 | 11/2004 | Yamanaka et al. |
| 2004/0249561 A1 | 12/2004 | Capozzi et al. |
| 2005/0123227 A1 | 6/2005 | Vonsovici et al. |
| 2005/0135730 A1 | 6/2005 | Welch et al. |
| 2005/0219068 A1 | 10/2005 | Jones et al. |
| 2005/0237617 A1 | 10/2005 | Carr et al. |
| 2005/0244103 A1 | 11/2005 | Kwakernaak |
| 2006/0114447 A1 | 6/2006 | Harris et al. |
| 2007/0024849 A1 | 2/2007 | Carrig et al. |
| 2007/0036486 A1 | 2/2007 | Miyadera et al. |
| 2007/0103362 A1 | 5/2007 | Arikan et al. |
| 2007/0171407 A1 | 7/2007 | Cole et al. |
| 2007/0223856 A1 | 9/2007 | Nunoya et al. |
| 2008/0088184 A1 | 4/2008 | Tung et al. |
| 2008/0123170 A1 | 5/2008 | Reichert et al. |
| 2008/0174461 A1 | 7/2008 | Hsu |
| 2008/0176681 A1 | 7/2008 | Donahoe |
| 2008/0181550 A1 | 7/2008 | Earnshaw |
| 2008/0205461 A1 | 8/2008 | Henrichs |
| 2009/0046746 A1 | 2/2009 | Munroe et al. |
| 2009/0128797 A1 | 5/2009 | Walsh |
| 2009/0195769 A1 | 8/2009 | Luo et al. |
| 2009/0279070 A1 | 11/2009 | Ueno |
| 2010/0027379 A1 | 2/2010 | Saulnier et al. |
| 2010/0085992 A1 | 4/2010 | Rakuljic et al. |
| 2010/0159858 A1 | 6/2010 | Dent et al. |
| 2010/0187442 A1 | 7/2010 | Hochberg et al. |
| 2010/0271614 A1 | 10/2010 | Albuquerque et al. |
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0091155 A1 | 4/2011 | Yilmaz et al. |

(56) References Cited

U.S. PATENT DOCUMENTS

| | | |
|---|---|---|
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |
| 2012/0182544 A1 | 7/2012 | Asahara et al. |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177383 A1 | 6/2015 | Sebastian et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallesasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0003805 A1 | 1/2018 | Popovich et al. |
| 2018/0024232 A1 | 1/2018 | Gilliland et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018197 A1 | 1/2019 | Boutami et al. |
| 2019/0025094 A1 | 1/2019 | Lewis et al. |
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Halstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |
| 2019/0204419 A1 | 7/2019 | Baba et al. |

(56) References Cited

U.S. PATENT DOCUMENTS

| | | |
|---|---|---|
| 2019/0204441 A1 | 7/2019 | Feneyrou et al. |
| 2019/0204443 A1 | 7/2019 | Yao et al. |
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1 | 12/2019 | Nicolaescu |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Aghari et al. |
| 2020/0116842 A1 | 4/2020 | Aghari et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0301070 A1 | 9/2020 | Nagarajan |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1 | 10/2020 | Hiratani |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132232 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0373162 A1 | 12/2021 | Wu et al. |
| 2021/0389244 A1 | 12/2021 | Bowman et al. |
| 2021/0396879 A1 | 12/2021 | Sun et al. |
| 2021/0405194 A1 | 12/2021 | Tsuchida |
| 2022/0003842 A1 | 1/2022 | Wang et al. |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |
| 2022/0107411 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0365214 A1 | 11/2022 | Sandborn et al. |
| 2022/0373667 A1 | 11/2022 | Khatana et al. |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0228878 A1 | 7/2023 | Asghari et al. |

(56) References Cited

U.S. PATENT DOCUMENTS

| | | | |
|---|---|---|---|
| 2023/0288566 A1 | 9/2023 | Nadkarni et al. | |
| 2023/0296732 A1 | 9/2023 | Xiao | |

FOREIGN PATENT DOCUMENTS

| | | | |
|---|---|---|---|
| CN | 103874945 A | 6/2014 | |
| CN | 104459881 A | 3/2015 | |
| CN | 204479750 U | 7/2015 | |
| CN | 105589074 A | 5/2016 | |
| CN | 105917257 A | 8/2016 | |
| CN | 106154248 A | 11/2016 | |
| CN | 106410607 A | 2/2017 | |
| CN | 106773028 A | 5/2017 | |
| CN | 106842232 A | 6/2017 | |
| CN | 106959439 A | 7/2017 | |
| CN | 107144847 A | 9/2017 | |
| CN | 107305184 A | 10/2017 | |
| CN | 107367734 A | 11/2017 | |
| CN | 107976666 A | 5/2018 | |
| CN | 108139465 A | 6/2018 | |
| CN | 108291970 A | 7/2018 | |
| CN | 108603758 A | 9/2018 | |
| CN | 109642952 A | 4/2019 | |
| CN | 110036276 A | 7/2019 | |
| CN | 107192355 B | 8/2019 | |
| CN | 110161516 A | 8/2019 | |
| CN | 110187350 A | 8/2019 | |
| CN | 110412685 A | 11/2019 | |
| CN | 111338025 A | 6/2020 | |
| CN | 112241014 A | 1/2021 | |
| DE | 10 2015 222061 A1 | 5/2017 | |
| DE | 10 2017 200795 A1 | 7/2018 | |
| DE | 10 2017 106 226 A1 | 9/2018 | |
| DE | 102019124598 A1 | 3/2020 | |
| EP | 0 523 921 A1 | 1/1993 | |
| EP | 2796890 A1 | 10/2014 | |
| EP | 2955542 B1 | 4/2017 | |
| EP | 3276371 A1 | 1/2018 | |
| EP | 3339924 A1 | 6/2018 | |
| EP | 3259615 B1 | 11/2019 | |
| EP | 3889644 A1 | 10/2021 | |
| GB | 1 585 053 A | 2/1981 | |
| GB | 2173664 A | 10/1986 | |
| JP | H1010227 A | 1/1998 | |
| JP | 2003224321 A | 8/2003 | |
| JP | 2004-151022 A | 5/2004 | |
| JP | 2007184511 A | 7/2007 | |
| JP | 2008160130 A | 7/2008 | |
| JP | 2008292370 A | 12/2008 | |
| JP | 2009-115696 A | 5/2009 | |
| JP | 2010151806 A | 7/2010 | |
| JP | 2010271624 A | 12/2010 | |
| JP | 2021004800 A | 1/2011 | |
| JP | 2014202716 A | 10/2014 | |
| JP | 2015-018640 A | 1/2015 | |
| JP | 2015092184 A | 5/2015 | |
| JP | 2015172540 A | 10/2015 | |
| JP | 2015180735 A | 10/2015 | |
| JP | 2015230259 A | 12/2015 | |
| JP | 2016-525209 A | 8/2016 | |
| JP | 5975203 B2 | 8/2016 | |
| JP | 2017097340 A | 6/2017 | |
| JP | 2017106897 A | 6/2017 | |
| JP | 2017524918 A | 8/2017 | |
| JP | 2017161484 A | 9/2017 | |
| JP | 2017-198514 A | 11/2017 | |
| JP | 2017-211348 A | 11/2017 | |
| JP | 2018-512600 A | 5/2018 | |
| JP | 2018520346 A | 7/2018 | |
| JP | 2018529955 A | 10/2018 | |
| JP | 2018188284 A | 11/2018 | |
| JP | 2018200273 A | 12/2018 | |
| JP | 2019502925 A | 1/2019 | |
| JP | 2019095218 A | 6/2019 | |
| JP | 2019525195 A | 9/2019 | |
| JP | 2019-537012 A | 12/2019 | |
| JP | 2020-16639 A | 1/2020 | |
| JP | 2020-34546 A | 3/2020 | |
| JP | 2002090457 A | 3/2020 | |
| JP | 2020085723 A | 6/2020 | |
| JP | 2021032848 A | 3/2021 | |
| JP | 7397009 A | 12/2023 | |
| KR | 20060086182 A | 7/2006 | |
| KR | 10-2015-0045735 A | 4/2015 | |
| KR | 20180013598 A | 2/2018 | |
| KR | 101 931 022 B1 | 12/2018 | |
| WO | 97/11396 A1 | 3/1997 | |
| WO | 2010123182 A1 | 10/2010 | |
| WO | 2010127151 A1 | 11/2010 | |
| WO | 2012123668 A1 | 9/2012 | |
| WO | 2012153309 A2 | 11/2012 | |
| WO | 2014/203654 A1 | 12/2014 | |
| WO | 2014/206630 A1 | 12/2014 | |
| WO | 2015/044370 A1 | 4/2015 | |
| WO | 2015/058209 A1 | 4/2015 | |
| WO | 2015/098027 A1 | 7/2015 | |
| WO | 2015/200800 A1 | 12/2015 | |
| WO | 2016/097409 A2 | 6/2016 | |
| WO | 2017/023107 A1 | 2/2017 | |
| WO | 2017/083597 A1 | 5/2017 | |
| WO | 2017/095817 A1 | 6/2017 | |
| WO | 2017/102156 A1 | 6/2017 | |
| WO | 2017/216581 A1 | 12/2017 | |
| WO | 2018/003852 A1 | 1/2018 | |
| WO | 2018/036946 A1 | 3/2018 | |
| WO | 2018/060318 A1 | 4/2018 | |
| WO | 2018/116412 A1 | 6/2018 | |
| WO | 2018/160240 A2 | 9/2018 | |
| WO | 2018/230474 A1 | 12/2018 | |
| WO | 2019/010320 A1 | 1/2019 | |
| WO | 2019/018894 A1 | 1/2019 | |
| WO | 2019/121069 A1 | 6/2019 | |
| WO | 2019/130472 A1 | 7/2019 | |
| WO | 2019/196135 A1 | 10/2019 | |
| WO | 2019/217761 A1 | 11/2019 | |
| WO | 2019/217857 A1 | 11/2019 | |
| WO | 2019/236430 A1 | 12/2019 | |
| WO | 2019/236464 A1 | 12/2019 | |
| WO | 2020/005537 A1 | 1/2020 | |
| WO | 2020/033161 A1 | 2/2020 | |
| WO | 2020/046513 A1 | 3/2020 | |
| WO | 2020/076566 A1 | 4/2020 | |
| WO | 2020/110779 A1 | 6/2020 | |
| WO | 2020/129284 A1 | 6/2020 | |
| WO | 2020/234797 A1 | 11/2020 | |
| WO | 2020/251633 A1 | 12/2020 | |
| WO | 2021/024038 A1 | 2/2021 | |
| WO | 2021/252894 A1 | 12/2021 | |
| WO | 2022/013422 A1 | 1/2022 | |
| WO | 2022/233503 A1 | 11/2022 | |
| WO | 2023/118295 A1 | 6/2023 | |

OTHER PUBLICATIONS

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechTHESIS, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

(56) References Cited

OTHER PUBLICATIONS

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.
Wojtkiewicz et al., "Two-dimensional signal processing in FMCW radars", National Conference on Circuit Theory and Electronic Networks, vol. 2, Oct. 1997, pp. 1-6.
Zhu et al., "Dual-Comb Ranging", Engineering, 4, Oct. 16, 2018, pp. 772-778.
Aalto, Timo Eta L., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.
Anderson et al., "ladar: Frequency-Modulated Continuous Wave Laser Detection AND Ranging", Photogrammetric Engineering & Remote Sensing, vol. 83, No. 11, Nov. 2017.
Baghmisheh, B. B., "Chip-scale Lidar", Jan. 19, 2017, Electrical Engineering and Computer Sciences University of California, Berkeley.
Behroozpour et al., "Electronic-Photonic Integrated Circulator 3D Microimaging", IEEE Journal of Solid-State Circuits, Jan. 2017, vol. 52, No. 1, pp. 161-172.
Behroozpour, B. et al., "Lidar System Architectures and Circuits," IEEE Communications Magazine, Oct. 2017, pp. 135-142.
Carter et al., "Lidar 101: An Introduction to Lidar Technology, Data, and Applications", Nov. 2012, NOAA Coastal Services Center, 76 pages.
Chan, M.K, "Atmospheric transmission windows for high energy short pulse lasers", Thesis, Naval Postgraduate School, Dec. 2003.
Conditional Euclidean Clustering, retrieved on Jul. 9, 2022 from https://pcl.readthedocs.io/projects/tutorials/en/latest/cluster_extraction.html#cluster-extraction.
Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.
Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.
Doylend, J. K., "Two-dimensional free-space beam steering with an optical phased array on silicon-on-insulator", Oct. 1, 2011, Optics Express, 19(22), 21595-2160.
Euclidean Cluster Extraction, retrieved on Jul. 9, 2022 from https://pcl.readthedocs.io/projects/tutorials/en/latest/conditional_euclidean_clustering.html.
Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.
Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.
Goodman, J., "Speckle Phenomena in Optics Theory and Applications", Roberts and Company, Sep. 28, 2007, 130(2), pp. 413-414.
Gulati, et al., "A Low-Power Reconfigurable Analog-to-Digital Converter", IEEE Journal of Solid-State Circuits, Dec. 2001, vol. 36, No. 12, pp. 1900-1911.
Guo et al., "Beat-frequency adjustable Er3+-doped DBR fiber laser for ultrasound detection", Optics Express, Jan. 31, 2011, vol. 19, No. 3, pp. 2485-2492.
Haran, T., "Short-wave infrared diffuse reflectance of Textile Materials", Thesis, Georgia State University, 2008.
Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.
Lu, Z., "Silicon Photonic Switches for Optical Communication Applications", PHD Thesis. University of British Columbia, Sep. 29, 2017, 165 pages.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M. et al., "Multi-Wavelength Airborne Laser Scanning", ILMF 2011. New Orleans, Feb. 7-9, 2011.
PI Motion/Positioning, 2018, Retrieved from PI USA: http://www.pi-USA.US/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pierrottet et al., "Linear FMCW Laser Radar for Precision Range and Vector Velocity Measurements", MRS Online Proceeding Library Archive, Jan. 2008, pp. 1-9.
Pilot Photonics, Lyra OCS 1000, Optical comb laser module, Retrieved on Nov. 20, 2019 from Pilot Photonics: http://www.pilotphotonics.com/optical-frequency-comb-source/.
Poulton, C. V. MSC Thesis, "Integrated LIDAR with Optical Phased Arrays in Silicon Photonics", Massachusetts Institute of Technology, Sep. 2016, pp. 95-101.
Poulton, Christopher V. et al., "Coherent Solid-State LIDAR with Silicon Photonic Optical Phased Arrays", pp. 4091-4094, Oct. 15, 2017, Optics Letters, vol. 42, No. 20.
Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).
Royo et al., "An Overview of LIDAR Imaging Systems for Autonomous Vehicles", Appl. Sci., Sep. 30, 2019, 9(19):4093, 37 pages. https://doi.org/10.3390/app9194093.
Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.
Sandborn, Phillip Alan McGinnis, "FMCW Lidar: Scaling to the Chip-Level and Improving Phase-Noise-Limited Performance", Fall 2017, 18 pages.
Satyan, N. et al., "Precise control of broadband frequency chirps using optoelectronic feedback," Optics Express, Aug. 31, 2009, vol. 17, No. 18, pp. 15991-15999.

(56) References Cited

OTHER PUBLICATIONS

Schulmeister, Karl, "White Paper The new edition of the international laser product safety standard", IEC 60825-1, 2014.
Self, "Focusing of spherical Gaussian beams", Applied Optics, Mar. 1, 1983, vol. 22, No. 5, pp. 658-661.
Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.
Smit, Meint K. C. v., "Phasar-Based WDM-Devices: Principles, Design and Applications", IEEE Journal of Selected Topics in Quantum Electronics, Jan. 1, 1996, 2(2), 236-250.
Soref, Richard A. et al. "Electrooptical Effects in Silicon", IEEE Journal of Quantum Electronics, vol. QE-23, No. 1, Jan. 1987, pp. 123-129.
Stephens et al., "Demonstration of an Interferometric Laser Ranging System for a Follow-On Gravity Mission to GRACE", IEEE International Symposium on Geoscience and Remote Sensing, Jul. 31, 2006 to Aug. 4, 2006, pp. 1115-1118.
Sun, J., et al., "Large-scale silicon photonic circuits for optical phased arrays," vol. 20, No. 4, Jul./Aug. 2014. IEEE Journal of Selected Topics in Quantum Electronics.

USE OF FREQUENCY OFFSETS IN GENERATION OF LIDAR DATA

RELATED APPLICATIONS

This application is a continuation of U.S. patent application Ser. No. 16/542,648; filed on Aug. 16, 2019; entitled "Use of Frequency Offsets in Generation of LIDAR Data;" and incorporated herein in its entirety; and U.S. patent application Ser. No. 16/542,648 is a continuation-in-part of U.S. patent application Ser. No. 16/457,443; filed on Jun. 28, 2019; entitled "Use of Frequency Offsets in Generation of LIDAR Data;" and incorporated herein in its entirety.

FIELD

The invention relates to optical devices. In particular, the invention relates to LIDAR systems.

BACKGROUND

LIDAR technologies are being applied to a variety of applications. LIDAR specifications typically specify that LIDAR data be generated for a minimum number of sample regions in a field of view. LIDAR specifications also specify the distance of those sample regions from the LIDAR signal source and a re-fresh rate. The re-fresh rate is the frequency at which the LIDAR data is generated for all of the sample regions in the field of view. The ability of the given LIDAR system to generate the LIDAR data for the sample regions in the field of view becomes more difficult as the distance to the sample regions increases and as the refresh rate increases.

As LIDAR is being adapted to applications such as self-driving-vehicles, it becomes more desirable to generate LIDAR data for larger fields of view, increasing numbers of points, further distances, and at faster re-fresh rates. As a result, there is a need for a LIDAR system that capable of generating LIDAR data for larger numbers of sample regions.

SUMMARY

A LIDAR system includes a light source that outputs an outgoing LIDAR signal that includes multiple different channels. The LIDAR system also generate multiple composite light signals that each carries a signal couple and are each associated with a different one of the channels. A signal couple includes a reference signal and an associated comparative signal. The comparative signals each include light from the outgoing LIDAR signal that has been reflected by one or more objects located outside of the LIDAR system. The reference signals also include light from the outgoing LIDAR signal but also exclude light that has been reflected by any object located outside of the LIDAR system. There is a frequency differential between a frequency of the reference signal and a frequency of the associated comparative signal. The frequency differential includes a contribution from a frequency offset that is induced by electronics. The electronics induce the frequency offset such that the frequency offset is different for each signal couple.

BRIEF DESCRIPTION OF THE FIGURES

FIG. 3A is a schematic of the processing unit.

FIG. 3B illustrates the relationship between the frequencies associated with different channels in a data signal processed by the schematic of FIG. 3A.

FIG. 3C illustrates a schematic for an example of electronics that are suitable for use with a processing unit constructed according to FIG. 3A.

FIG. 4A is a schematic of the processing unit.

FIG. 4B illustrates the relationship between the frequencies associated with different channels in a data signal processed by the schematic of FIG. 4A.

FIG. 4C illustrates a schematic for an example of electronics that are suitable for use with a processing unit constructed according to FIG. 4A.

DESCRIPTION

The LIDAR system concurrently generates an outgoing light signal that includes multiple channels that are each of a different wavelength. The different channels are directed to the same sample region in a field of view or to different sample regions in the field of view and LIDAR data (distance and/or radial velocity between the source of a LIDAR output signal and a reflecting object) is generated for each of the sample regions. The concurrent use of multiple different channels to generate LIDAR data accelerates the generation of LIDAR data for a field of view and accordingly allows the LIDAR specifications to be satisfied for applications that require larger fields of view, increased numbers of sample regions, further field of view distances, and lower re-fresh rates.

The LIDAR system also generate multiple composite light signals that each carries a signal couple and are each associated with a different one of the channels. A signal couple includes a reference signal and an associated comparative signal. The comparative signals each include light from the outgoing LIDAR signal that has been reflected by one or more objects located outside of the LIDAR system. The reference signals also include light from the outgoing LIDAR signal but also exclude any light that has been reflected by any object located outside of the LIDAR system. There is a frequency differential between a frequency of the reference signal and a frequency of the associated comparative signal. The frequency differential includes a contribution from a frequency offset that is induced by electronics. The electronics induce the frequency offset such that the frequency offset is different for each signal couple.

Prior efforts to create the frequency offset have used a different light source for the reference signal and the comparative signal. However, the disclosed LIDAR system creates the frequency offset using reference signals and comparative signals from the same light source. As a result, the disclosed LIDAR system reduces the number of light sources that are required and accordingly reduces the number of light sources that are needed.

Figure 1A:
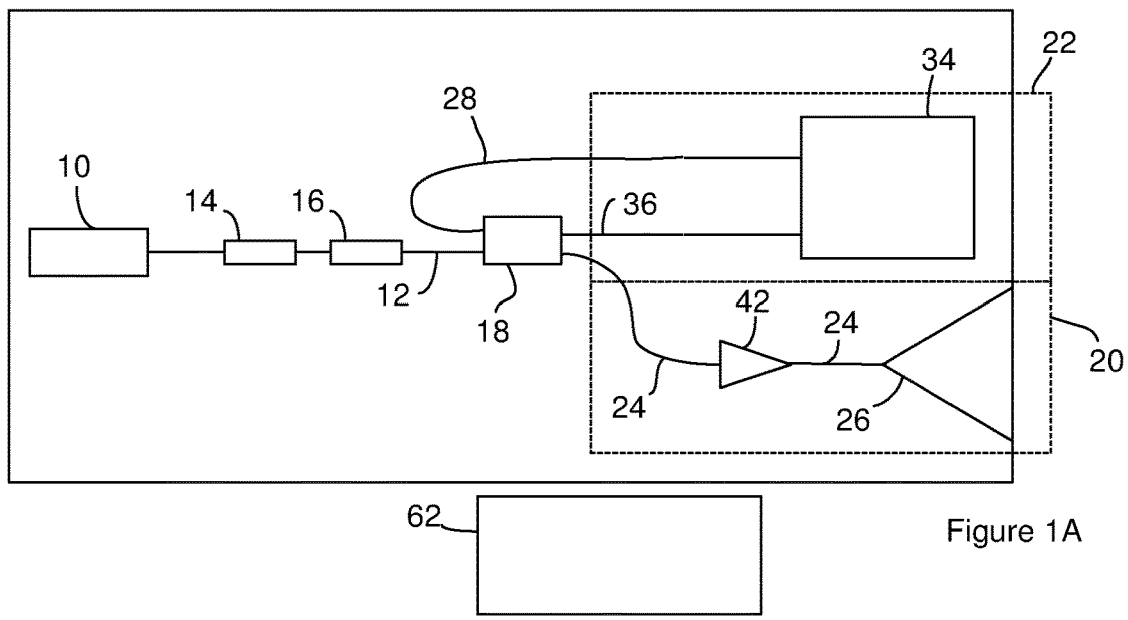
FIG. 1A is a schematic of a LIDAR system.

FIG. 1A is a schematic of a LIDAR system. The system includes a light source 10 such as a laser that outputs an outgoing LIDAR signal. The outgoing LIDAR signal carries one or more channels. When the outgoing LIDAR signal carries multiple different channels, the different channels can each be at a different wavelength. In some instances, the wavelengths of the channels are periodically spaced in that the wavelength increase from one channel to the next channel is constant or substantially constant. A suitable light source 10 for generating multiple channels with periodically spaced wavelengths includes, but is not limited to, comb lasers, multiple single wavelength lasers multiplexed into to single optical waveguide, sources such as that described in U.S. patent application Ser. No. 11/998,846, filed on Nov. 30, 2017, granted U.S. Pat. No. 7,542,641, entitled "Multi-Channel Optical Device," and incorporated herein in its entirety.

The LIDAR system also includes a utility waveguide 12 that receives an outgoing LIDAR signal from the light source 10. A modulator 14 is optionally positioned along the utility waveguide 12. The modulator 14 can be configured to modulate the power of the outgoing LIDAR signal and accordingly the resulting LIDAR output signal(s). Electronics 62 can operate the modulator 14. Accordingly, the electronics can modulate the power of the outgoing LIDAR signal and accordingly the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. Pat. No. 617,810, filed on Sep. 21 1993, entitled Integrated Silicon PIN Diode Electro-Optic Waveguide, and incorporated herein in its entirety.

An amplifier 16 is optionally positioned along the utility waveguide 12. Since the power of the outgoing LIDAR signal is distributed among multiple channels, the amplifier 16 may be desirable to provide each of the channels with the desired power level on the utility waveguide 12. Suitable amplifiers include, but are not limited to, semiconductor optical amplifiers (SOAs).

The utility waveguide 12 carries the outgoing LIDAR signal from the modulator 14 to a signal-directing component 18. The signal-directing component 18 can direct the outgoing LIDAR signal to a LIDAR branch 20 and/or a data branch 22. The LIDAR branch outputs one or more LIDAR output signals from the LIDAR chip and receives LIDAR input signals that result from reflection of the one or more LIDAR output signals. The data branch processes the LDAR input signals for the generation of LIDAR data (distance and/or radial velocity between the source of the LIDAR output signal and a reflecting object).

The LIDAR branch includes a LIDAR signal waveguide 24 that receives at least a portion of the outgoing LIDAR signal from the signal-directing component 18. An output component 26 receives the outgoing LIDAR signal from the LIDAR signal waveguide 24 and outputs the outgoing LIDAR signal such that the outgoing LIDAR signal exits from the LIDAR chip. The outgoing LIDAR signal exit from the LIDAR chip as one or more LIDAR output signals that travel through the atmosphere in which the LIDAR system is positioned. Each of the LIDAR output signals carries one of the channels carried in the outgoing LIDAR signal.

The LIDAR output signals can be reflected by a reflecting object (not shown) located outside of the LIDAR system. Each of the reflected LIDAR output signals travel through the atmosphere in which the LIDAR system is positioned and returns to the output component 26 as a LIDAR input signal. The output component 26 receives the LIDAR input signals and outputs the result on the LIDAR signal waveguide 24 as an incoming LIDAR signal.

When the outgoing LIDAR signal includes multiple different channels at different wavelengths, the output component 26 can be configured such that the LIDAR output signals carrying different channels are incident on the same sample region in the field of view or such that the LIDAR output signals carrying different channels are incident on different sample regions in the field of view. For instance, the output component 26 can be configured such that LIDAR output signals carrying different channel travels away from the LIDAR chip in different directions or such that LIDAR output signals carrying different channels travel away from the LIDAR chip in the same direction or in substantially in the same direction and at least partially overlap one another at the maximum distance at which the LIDAR system is configured to generate LIDAR data.

In some instances, the output component 26 also includes beam steering functionality. In these instances, the output component 26 can be in electrical communication with electronics 62 that can operate the output component 26 so as to steer the LIDAR output signals from one of the sample regions in a field of view to other sample regions in the field of view. The output component 26 and/or electronics can be configured such that the different LIDAR output signals are steered concurrently or independently.

Although the output component 26 is illustrated as a single component, the output component 26 can include multiple optical components and/or electrical components. Suitable output components 26 include, but are not limited to, optical phased arrays (OPAs), transmission diffraction gratings, reflection diffraction gratings, and Diffractive Optical Elements (DOE). Suitable output components 26 with beam steering capability include, but are not limited to, optical phased arrays (OPAs) with active phase control elements on the array waveguides.

The LIDAR signal waveguide 24 carries the incoming LIDAR signal to the signal-directing component 18. The signal-directing component 18 directs the incoming LIDAR signal to the utility waveguide 12 and/or a comparative signal waveguide 28. The portion of the incoming LIDAR signal-directed to the comparative signal waveguide 28 serves a comparative signal. The comparative signal waveguide 28 carries the comparative signal to the processing component 34.

The signal-directing component 18 is configured such that when the signal-directing component 18 directs at least a portion of the incoming LIDAR signal to the comparative signal waveguide 28, the signal-directing component 18 also directs at least a portion of the outgoing LIDAR signal to a reference signal waveguide 36. The portion of the outgoing LIDAR signal received by the reference signal waveguide 36 serves as a reference signal. The reference signal waveguide 36 carries the reference signal to the processing component 34.

As will be described in more detail below, the processing component 34 combines the comparative signal with the reference signal to form a composite signal that carries LIDAR data for one or more sample regions in the field of view. Accordingly, the composite signal can be processed so as to extract LIDAR data for one or more sample regions in the field of view.

The signal-directing component 18 can be an optical coupler. When the signal-directing component 18 is an optical coupler, the signal-directing component 18 directs a first portion of the outgoing LIDAR signal to the LIDAR signal waveguide 24 and a second portion of the outgoing LIDAR signal to the reference signal waveguide 36 and also directs a first portion of the incoming LIDAR signal to the utility waveguide 12 and a second portion of the incoming LIDAR signal to the comparative signal waveguide 28. Accordingly, the second portion of the incoming LIDAR signal can serve as the comparative signal and the second portion of the outgoing LIDAR signal can serve as the reference.

The signal-directing component 18 can be an optical switch such as a cross-over switch. A suitable cross-over switch can be operated in a cross mode or a pass mode. In the pass mode, the outgoing LIDAR signal is directed to the LIDAR signal waveguide 24 and an incoming LIDAR signal would be directed to the utility waveguide 12. In the cross mode, the outgoing LIDAR signal is directed to the reference signal waveguide 36 and the incoming LIDAR signal is directed to the comparative signal waveguide 28. Accordingly, the incoming LIDAR signal or a portion of the incoming LIDAR signal can serve as the comparative light signal and the outgoing LIDAR signal or a portion of the outgoing LIDAR signal can serve as the reference light signal.

An optical switch such as a cross-over switch can be controlled by the electronics. For instance, the electronics can control operate the switch such that the switch is in the cross mode or a pass mode. When LIDAR output signals are to be transmitted from the LIDAR system, the electronics operate the switch such that the switch is in the pass mode. When LIDAR input signals are to be received by the LIDAR system, the electronics operate the switch such that the switch is in the cross-over mode. In an embodiment disclosed below, the electronics operate the switch in the pass mode during an output period and operate the switch in the crossover mode during the feedback period. As a result, the composite signals and/or the reference signals are not generated during at least a portion of the output period and/or the LIDAR output signals are not generated during at least a portion of the feedback period. The use of a switch can provide lower levels of optical loss than are associated with the use of an optical coupler as the signal-directing component 18.

In the above descriptions of the operation of the signal-directing component 18, the comparative light signals and the reference light signals are concurrently directed to the data branch. As a result, the processing component 34 can combine the comparative signal with the reference signal.

In some instances, an optical amplifier 42 is optionally positioned along the LIDAR signal waveguide 24 and is configured to provide amplification of the outgoing LIDAR signal and/or of the incoming LIDAR signal. Accordingly, the effects of optical loss at the signal-directing component 18 can be reduced.

Figure 1B:
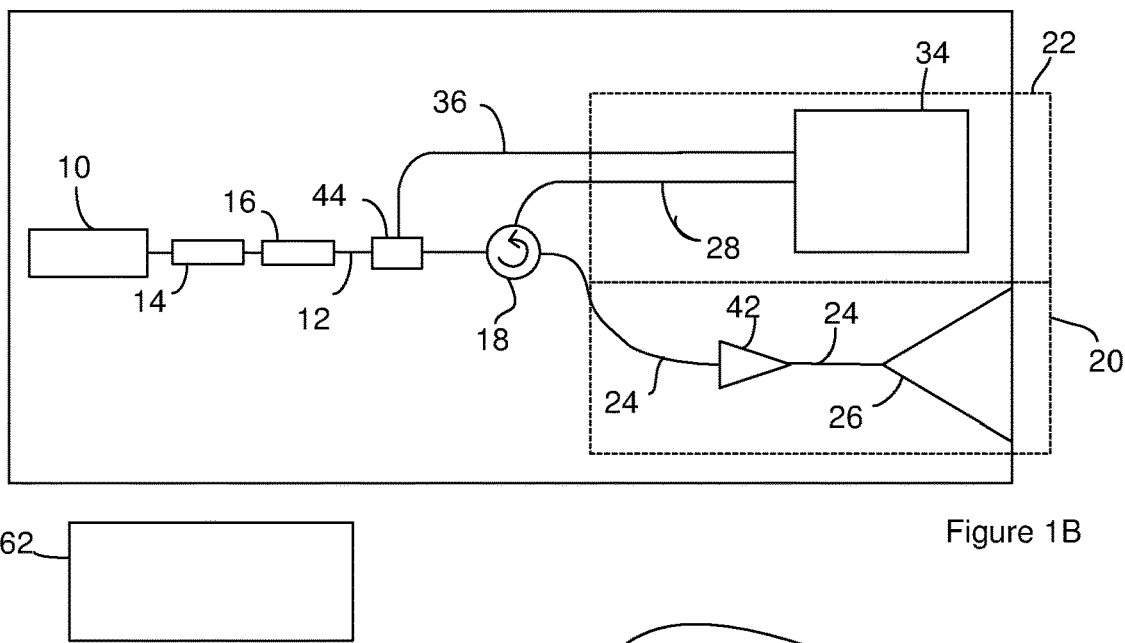
FIG. 1B is a schematic of another embodiment of a LIDAR system.

FIG. 1B illustrates the LIDAR system of FIG. 1A modified to include an optical circulator as the signal-directing component 18. The optical circulator is configured such that the outgoing LIDAR signal is directed to the LIDAR signal waveguide 24 and the incoming LIDAR signal is directed to the comparative signal waveguide 28. The comparative signal waveguide 28 carries the comparative signal to the processing component 34. Additionally, a tap component 44 is positioned along the utility waveguide 12. The tap component 44 is configured to tap off a first portion of the outgoing LIDAR signal such that the first portion of the outgoing LIDAR signal is received on the reference signal waveguide 36. The first portion of the outgoing LIDAR signal received by the reference signal waveguide 36 serves as the reference signal. The reference signal waveguide 36 carries the reference signal to the processing component 34. Accordingly, the electronics can operate the LIDAR system of FIG. 1B as disclosed in the context of FIG. 1A. Suitable optical circulators include, but are not limited to, Faraday rotator based optical fiber circulators, and integrated optical circulators. Although the signal-directing component 18 of FIG. 1B is disclosed as an optical circulator, the signal-directing component 18 of FIG. 1B can be an optical coupler or optical switch.

Figure 2A:
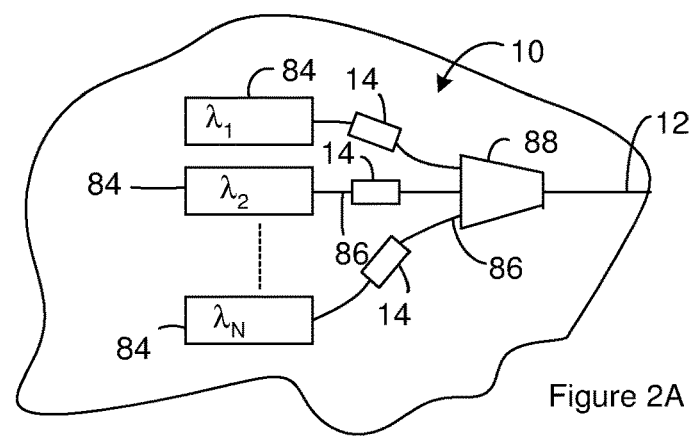
FIG. 2A illustrates a light source that includes multiple laser sources.

As noted above, one or more of the light sources 10 can be a comb laser. However, other constructions of the light source 10 are possible. For instance, FIG. 2A illustrates an example of a light source 10 that includes multiple laser sources 84. In some instances, each of the laser sources 84 outputs one or more of the channels on a source waveguide 86. The source waveguides 86 carry the channels to a laser multiplexer 88 that combines the channels so as to form a light signal that is received on a channel waveguide or the utility waveguide 12. Suitable laser multiplexers 88 include, but are not limited to, Arrayed Waveguide Grating (AWG) multiplexers, echelle grating multiplexers, and star couplers. The electronics can operate the laser sources 84 so the laser sources 84 concurrently output each of the channels. The electronics can operate the laser sources 84 so the laser sources 84 concurrently output each of the channels.

In some instances, each of the laser sources 84 outputs one of the channels on a source waveguide 86. The total number of laser sources 84 included in the light source 10 can be greater than or equal to the number of LIDAR output signals that are concurrently directed to a sample region. In some instances, total number of laser sources 84 included in the light source 10 is equal to the number of LIDAR output signals that are concurrently directed to a sample region. As a result, each laser sources 84 can be the source of a different one of the LIDAR output signals that are concurrently directed to a sample region.

The electronics can operate the laser sources 84 independently. For instance, the electronics can operate the laser sources 84 so as to provide the LIDAR output signals with a particular frequency versus time waveform. Since the electronics can operate the laser sources 84 independently and each laser sources 84 can be the source of a different one of the LIDAR output signals, the electronics can operate the laser sources 84 so different LIDAR output signals have different frequency versus time waveforms.

A modulator 14 can optionally be positioned along one or more of the source waveguides 86. The modulator 14 can each be configured to modulate the power of one of the channels and accordingly the amplitude of the resulting LIDAR output signal(s). The electronics can operate the modulator 14. Accordingly, the electronics can modulate the power of the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. Pat. No. 617,810, filed on Sep. 21 1993, entitled Integrated Silicon PIN Diode Electro-Optic Waveguide, and incorporated herein in its entirety.

The electronics can operate the modulators and/or the laser sources 84 so as to provide different LIDAR output signals with different waveforms. For instance, the electronics can operate one or more laser sources 84 to each produce a LIDAR output signal with a frequency that is not a function of time and an amplitude that is not a function of time such as a continuous wave. Additionally or alternately, the electronics can operate one or more laser sources 84 and associated modulator(s) 14 so as to generate one or more LIDAR output signals that has an amplitude that is a function of time. Additionally or alternately, the electronics can operate one or more laser sources 84 and associated modulator(s) 14 so as to generate a LIDAR output signal with a frequency that is a function of time. Additionally or alternately, the electronics can operate one or more laser sources 84 and associated modulator(s) 14 so as to generate a LIDAR output signal with a frequency that is a function of time and an amplitude that is a function of time.

During operation of the LIDAR system, the generation of LIDAR data is divided into a series of cycles where LIDAR data is generated for each cycle. Each LIDAR data result can be associated with a sample region in the field of view in that the resulting LIDAR data is the LIDAR data for one or more object located in that sample region. For instance, when multiple LIDAR output signals are directed to the same sample region in a field of view, one or more LIDAR data results can be generated from each one of all or a portion of the multiple LIDAR output signals during that cycle and each of the LIDAR data results can be LIDAR data for an object in that sample region. When multiple LIDAR output signals are directed to different sample regions in a field of view, one or more LIDAR data results can be generated from each one of all or a portion of the multiple LIDAR output signals during that cycle and all or a portion of the LIDAR data results can be for an object located in a different sample region in the field of view. In some instances, the one or more LIDAR output signals are directed to different sample regions in different cycles. As a result, the LIDAR data generated during different cycles is generated for different selections of the sample regions until generation of the LIDAR data for the field of view is complete and the LIDAR system repeats the process of generating LIDAR data for the field of view. When the LIDAR system repeatedly generates LIDAR data for the field of view, the LIDAR system can return the one or more LIDAR output signals to the same sample regions for which LIDAR data was previously generated.

The cycles can be performed such that the duration of each cycle can be divided into different time periods. For instance, the duration of a cycle can include one or more data periods where the LIDAR input signals are generated and received at the LIDAR chip and one or more re-location periods where the LIDAR output signal is moved from one sample region to another sample region. In a continuous scan mode, the cycle does not include any re-location periods and the LIDAR output signal is moved continuously. In one example, the cycles include multiple data periods and multiple different LIDAR output signals each caries a different channel to the same sample region. In another example, the cycles include multiple data periods and multiple different LIDAR output signals each caries a different channel to the same sample region.

Figure 2B:
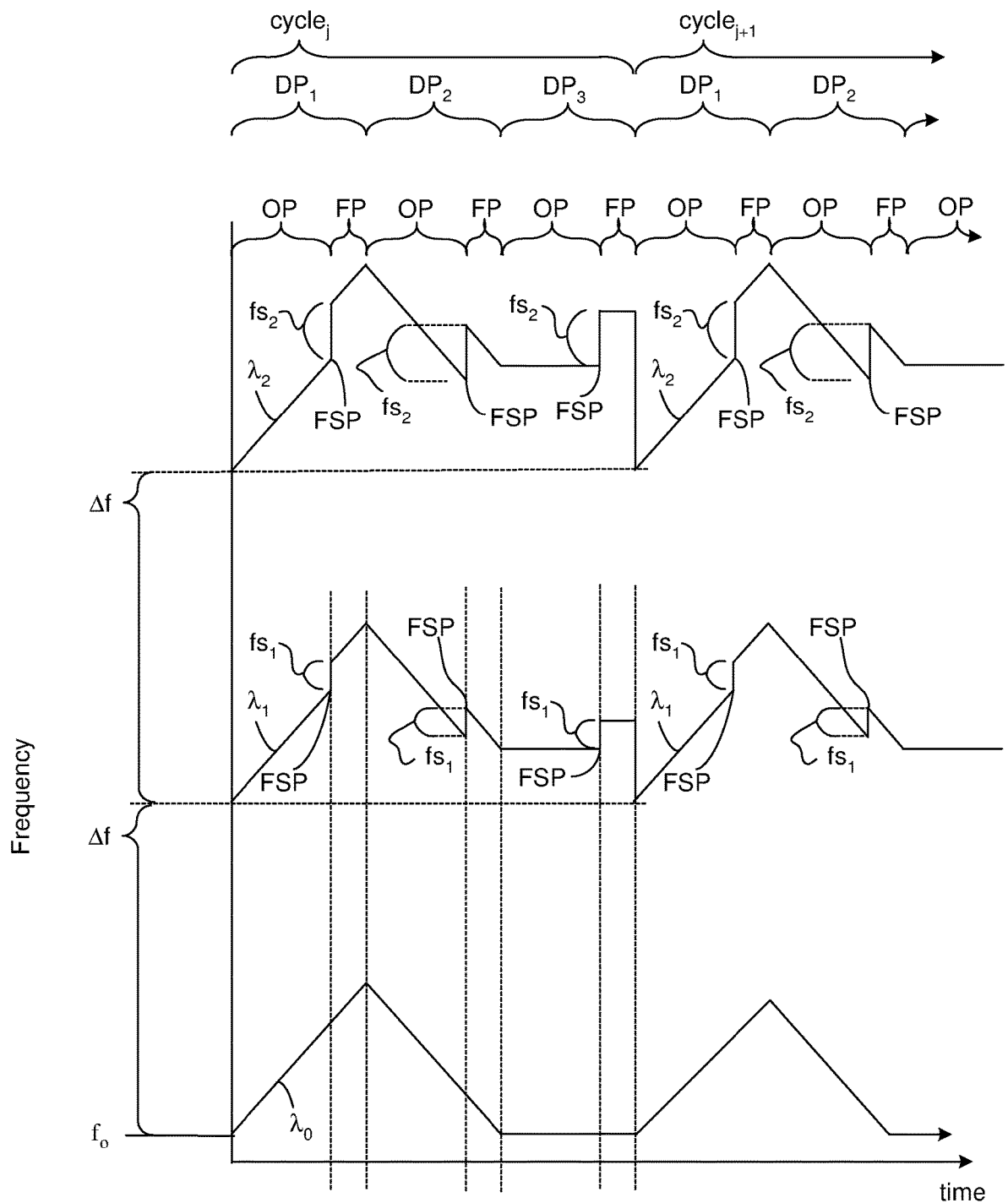
FIG. 2B illustrates the frequencies of LIDAR output signals that carry different channels as a function of time.

FIG. 2B shows an example of a relationship between the frequency of multiple different LIDAR output signals, time, cycles and the data periods. The LIDAR output signals are each associated with a channel index i that starts at 0 and goes to N where N+1 is the number of LIDAR output signals. Different LIDAR output signals are labeled $\lambda_i$ in FIG. 2B. The base frequency of each LIDAR output signal ($bf_i$) can be the lowest frequency of the LIDAR output signal during a cycle and can be: $bf_i = f_o + i \ast \Delta f$. Accordingly, the base frequencies can be linearly spaced. Although FIG. 2B shows the frequencies of three LIDAR output signals labeled $\lambda_0$, $\lambda_1$ and $\lambda_2$; the LIDAR system can output only one LIDAR output signal or more than three output signals.

FIG. 2B shows frequency versus time for a sequence of two cycles labeled $cycle_j$ and $cycle_{j+1}$. In some instances, the frequency versus time pattern is repeated in each cycle as shown in FIG. 2B. The illustrated cycles do not include re-location periods and/or re-location periods are not located between cycles. As a result, FIG. 2B illustrates the results for a continuous scan.

Each cycle includes K data periods that are each associated with a period index k and are labeled $DP_k$. In the example of FIG. 2B, each cycle includes three data periods labeled $DP_k$ with k=1, 2, and 3. In some instances, the frequency versus time pattern is the same for the data periods that correspond to each other in different cycles as is shown in FIG. 2B. Corresponding data periods are data periods with the same period index. As a result, each data period $DP_1$ can be considered corresponding data periods and the associated frequency versus time patterns are the same in FIG. 2B. At the end of a cycle, the electronics return the frequency of each channel to the same frequency level. For instance, in FIG. 2B, the electronics return the frequency of channel i to $f_o + i \ast \Delta f$ to start each cycle.

Each data period includes an output period labeled OP and a feedback period labeled FP. During the output period and the feedback period, the frequency changes at a linear rate $\alpha$. The rate and direction of change a is the same during the output period and the feedback period in the same data period. However, the rate of change can be different for different channels and/or for different data periods.

For a portion of the channels or for all of the channels, there is an offset period (labeled FSP) between the output periods and the feedback periods included in all or a portion of the data periods included in each cycle. During the offset period, the frequency of the LIDAR output signal and the associated reference signal changes by an amount of the frequency offset labeled $fs_i$. In FIG. 2B, the channel $\lambda_0$ does not have a frequency offset between the output periods and the feedback periods while the channels $\lambda_1$ has a frequency offset $fs_i$ between the output periods and the feedback periods and $\lambda_2$ have frequency offset $fs_2$ between the output periods and the feedback periods.

The frequency offsets for different channels can be different. For instance, the change in the frequency offset between channels that are adjacent to one another on the wavelength spectrum can be separated by a constant. In one example, $fs_i = W + i \ast (df)$ where W is a constant that can be zero or non-zero and df is a constant that represents the change in the frequency offset for channels that are adjacent to one another on the wavelength spectrum. The value of df can be positive or negative. In FIG. 2B, df is shown as positive. In one example, the frequency offsets for different channels are different and one of the frequency offsets is zero for one of the channels. In another example, the frequency offsets for different channels are different and none of the channels has a frequency offset that is zero.

Figure 2C:
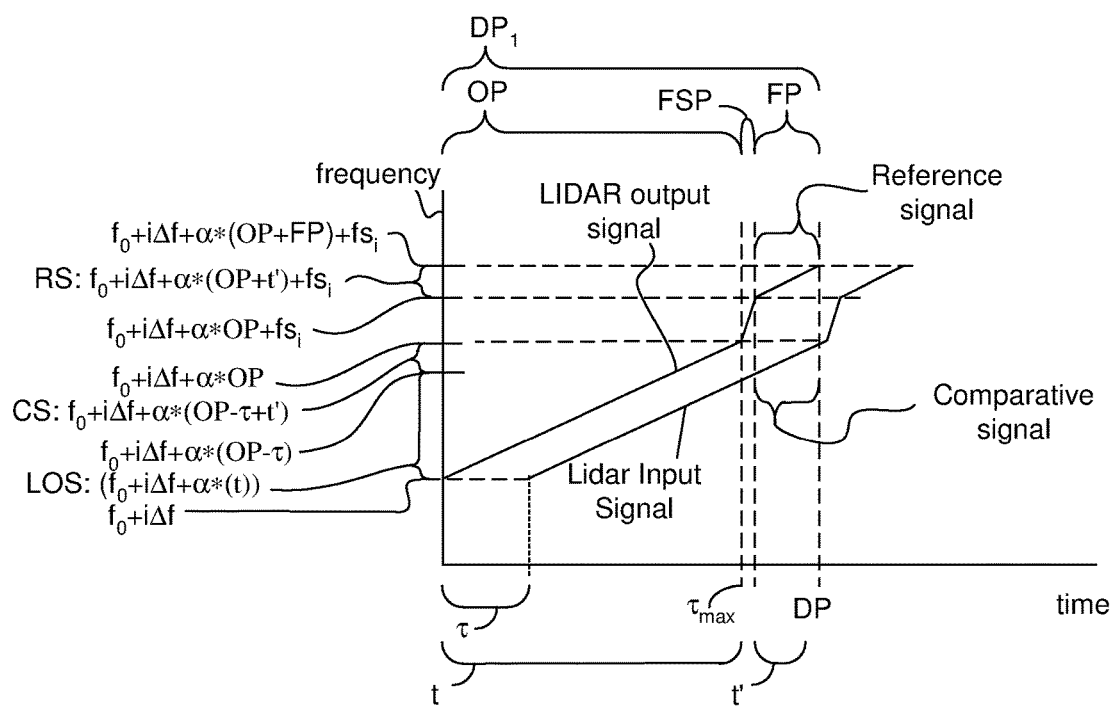
FIG. 2C illustrates an example of different light signals that can results from the LIDAR output signal of FIG. 2B.

FIG. 2C is a graph of frequency versus time showing the relationship between a LIDAR output signal and the resulting LIDAR input signal during the data period labeled $DP_1$.

During the output period, the frequency of the LIDAR output signal can be represented by Equation 1: $f_i=f_o+i*\Delta f+\alpha*t$ where $\alpha$ represents that rate of frequency change and t represents time and is equal to zero at the start of the output period. During the feedback period, the frequency of the LIDAR output signal can be represented by Equation 2: $f_i=f_o+i*\Delta f+\alpha*OP+fs_i+\alpha*t'$ where a represents the rate of frequency change, OP represents the duration of the output period and t' represents a time that is equal to zero at the start of the feedback period.

FIG. 2C also shows an example of the LIDAR input signals that can result from the illustrated LIDAR output signal. As described above, the LIDAR output signal travels away from the LIDAR chip and is reflected by an object located off of the LIDAR system. The reflected LIDAR output signal returns to the LIDAR system as the LIDAR input signal in FIG. 2C. The roundtrip time between the output of the LIDAR output signal and the receipt of the LIDAR input signal is labeled $\tau$ in FIG. 2C. The maximum roundtrip time for which the LIDAR system is configured to generate reliable LIDAR data is labeled $\tau_{max}$ in FIG. 2C. Although the LIDAR input signal shown in FIG. 2C is shown as returning to the LIDAR system at the time labeled $\tau$, the LIDAR input signal can return to the LIDAR system with any roundtrip time greater than or equal to zero and up to $\tau_{max}$.

As will become evident below, the LIDAR data is generated from the one or more LIDAR input signals and the one or more reference signals that occur during the feedback period. As a result, the LIDAR system can be constructed such that $\tau \leq \tau_{max} \leq OP$. In this configuration, any LIDAR output signals that experience the longest desirable roundtrip time ($\tau_{max}$) will begin returning to the LIDAR system before or at the start of the feedback period. As will become evident below, the LIDAR data is generated from light signals that occur during the feedback period. Since $\tau_{max} \leq OP$, LIDAR input signals with a roundtrip time of $\tau_{max}$ will be returning to the LIDAR system during the feedback period. As a result, LIDAR data can be generated for these signals. In some instances, $\tau_{max}=OP$ as shown in FIG. 2B.

Additionally or alternately, the LIDAR system can be configured to have a FP selected such that FP+FSP≤$\tau$. In some instances, FSP is zero, essentially zero, or is small enough relative to FP that FSP can be treated as zero. As a result, in some instances, FP−s selected such that FP≤t. In these configurations, any LIDAR output signals output during the feedback period, i.e. after the output period, are not received or are not substantially received as LIDAR input signals during the feedback period. As a result, the LIDAR output signals output after the frequency offset do not return to the LIDAR system during the feedback period and accordingly do not interfere with the LIDAR input signal(s) that occur during the feedback period. In some instances, the LIDAR system is configured such that FP+FSP≤$\tau$≤$\tau_{max}$ or FP≤$\tau$≤$\tau_{max}$. For instance, the LIDAR system can be used in applications where the values of $\tau$ are such that ti is generally FP≤$\tau$≤$\tau_{max}$ or FP+FSP≤$\tau$≤$\tau_{max}$.

The LIDAR data is generated from the comparative signals and the reference signals that occur during the feedback period but not during the output period. For instance, the light from the portion of the LIDAR output signal(s) that are output during the output period becomes the comparative incoming LIDAR signal during the feedback period and accordingly becomes the comparative light signals during the feedback period. Since the LIDAR data is generated from the comparative light signals that occur during the feedback period, the light from this portion of the LIDAR output signal(s) is used in the generation of the LIDAR data. In contrast, the light from the portion of the LIDAR output signal(s) that are output during the feedback period are not used in the generation of the LIDAR data.

As discussed above, the light in the LIDAR output signal(s) comes from an outgoing LIDAR signal that is also the source of the light for the reference signals. The reference signals that occur during the feedback period are used in the generation of the LIDAR data. However, the reference signals that are generated during the output period are not used in the generation of the LIDAR data. This result can be achieved by the electronics using comparative and references signals generated during the feedback period to generate the LIDAR data but not using comparative and references signals generated during the output period to generate the LIDAR data.

Accordingly, the light in the outgoing LIDAR signal that becomes the LIDAR output signal(s) during the output portion is used in the generation of the LIDAR data; however, during the feedback portion, the light in the outgoing LIDAR signal that becomes the LIDAR output signal(s) is not used in the generation of the LIDAR data. Additionally, the light in the outgoing LIDAR signal that becomes the reference signal(s) during the output portion is not used in the generation of the LIDAR data; however, the light in the outgoing LIDAR signal that becomes the reference signal(s) during the feedback portion is used in the generation of the LIDAR data.

Since the LIDAR output signals and the reference signals both come from the same outgoing LIDAR signal, the reference signals have the same or about the same frequency of the LIDAR output signal(s) at the same point in time. As a result, the portion of the LIDAR output signal in FIG. 2C that occurs during the feedback period is labeled reference signal. Additionally, since the light for the comparative signals comes from the LIDAR input signals, the comparative signals have the same or about the same frequency of the LIDAR input signal(s) at the same point in time. As a result, the portion of the LIDAR input signal in FIG. 2C that occurs during the feedback period is labeled comparative signal. The portion of FIG. 2C labeled reference signals and comparative signals show the frequency versus time of the comparative and reference signals that are combined to form the composite signals disclosed above. Additionally, since the labeled reference signals and comparative signals occur during the feedback period, these represent the components of the composite signal from which the LIDAR data is generated. The reference signal and the comparative signal for each channel originates from a common light source 10 and/or a common laser sources 84. As a result, the number of lasers needed to produce channels with reference signals and comparative signals with frequency differentials that have different frequency offsets is reduced.

The frequency axis of FIG. 2C includes several equations that show the frequency at multiple different locations on the axis. Several of the equations are particular to one of the curves shown on the graph. For instance, the equation shown after "RS:" provides the frequency for the reference signal. The equation shown after "CS:" provides the frequency for the comparative signal. The equation shown after "LOS:" provides the frequency for the LIDAR output signal. The frequency differential between the reference signals can be determined by subtracting the equation shown after "CS:" from the equation shown after "RS:" to get $\alpha*\tau+fs_i$. This result shows that the frequency differential has at least two sources. For instance, a portion of this frequency differential is the frequency offset $fs_i$ and another portion of this frequency differential is a result of the roundtrip delay, τ. The frequency offset is electronically encoded into the reference signals and the comparative signals by the electronics through use of the one or more modulators described above and/or operation of the light source 10. In contrast, the frequency differential resulting from roundtrip delay is induced by the distance between the LIDAR system and the object off which the LIDAR output signals are reflected.

Although not shown in FIG. 2C, an example of the frequency of the LIDAR output signal during the output period for the data period labeled $DP_2$ in FIG. 2B can be represented by Equation 3: $f_i=f_o+i*\Delta f+fs_i+\alpha*(OP+FP-t)$ where OP represents the duration of the output period, FP represents the duration of the feedback period, and t represents a time that is equal to zero at the start of the output period. An example of the frequency of the LIDAR output signal during the feedback period for the data period labeled $DP_2$ in FIG. 2B can be represented by Equation 4: $f_i=f_o+i*\Delta f+2fs_i+\alpha*(FP-t')$ where OP represents the duration of the output period and t' represents time and is equal to zero at the start of the feedback period.

In FIG. 2B, the rate of frequency change (α) is shown as being the same in data period DP1 and in data period DP2. However, the rate of frequency change (α) can be different in data period DP1 and data period DP2. Additionally or alternately, although the rate of frequency change (α) is shown as being the same for corresponding data periods in different channels, the rate of frequency change (α) can be different in corresponding data periods from different channels.

The data period labeled $DP_3$ in FIG. 2B is optional. The frequency of the LIDAR output signal during the output period for the data period labeled $DP_3$ in FIG. 2B can be a constant. The frequency of the LIDAR output signal during the feedback period for data period $DP_3$ can also be a constant where the difference between the frequency during the feedback period and during the output period is equal to $fs_i$. Although the frequency of the LIDAR output signal during data period $DP_3$ is shown as a constant, the frequency can also change at a rate α. When the data period $DP_3$ is used to identify corresponding frequencies as described below, the rate of frequency change during data period $DP_3$ can be different from the rates of frequency change during data period $DP_1$ and data period $DP_2$. Although FIG. 2B and FIG. 2C are disclosed using examples where the cycles have two data periods or three data periods, the cycles can one data period or more than three data periods.

The outgoing LIDAR signal and/or the channels can be modulated so as to produce a modulated outgoing LIDAR signal and accordingly, a LIDAR output signal that is a function of a sinusoid with a frequency provided by the above frequencies $f_i$. As an example, the outgoing LIDAR signal and/or the channels can be modulated so as to produce a LIDAR output signal with an electrical field magnitude that is a function of or is represented by the following Equation 5: $N+M*\cos(f_i*t+D)$ where t can represent the t or t' defined above and M, N and, D are constants where N and D can be zero or non-zero and M is not equal to zero.

One example of a LIDAR system includes a light source constructed according to FIG. 2A where the light source is configured to generate two LIDAR output signals. One of the LIDAR output signals carries a channel with a frequency versus time according to channel $\lambda_0$ of FIG. 2B and the other LIDAR output signal carries a channel with a frequency versus time according to channel $\lambda_1$ of FIG. 2B. Accordingly, the LIDAR system can be constructed according to FIG. 1A with two processing components 34. Another example of a LIDAR system includes a light source constructed according to FIG. 2A where the light source is configured to generate three LIDAR output signals. One of the LIDAR output signals carries a channel with a frequency versus time according to channel $\lambda_0$ of FIG. 2B, another LIDAR output signal carries a channel with a frequency versus time according to channel $\lambda_1$ of FIG. 2B, and another LIDAR output signal carries a channel with a frequency versus time according to channel $\lambda_2$ of FIG. 2B. Accordingly, the LIDAR system can be constructed according to FIG. 2A with three processing components 34. As is evident from these examples, the number of processing components 34 included in the LIDAR system can match the number of LIDAR output signals that each carries a different channel.

Suitable laser sources 84 for use with a light source 10 constructed according to FIG. 2A include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

The duration of the offset period can be short in order to increase the possible durations of the feedback period and/or the output period. For instance, the duration of the offset period can be 0.0 second and the frequency offset can accordingly be a step function. The duration of the offset period (FSP) can be non-zero as shown in FIG. 2C. In order to illustrate a non-zero duration for the offset period (FSP), FIG. 2C shows an offset period (FSP) duration that may be considered exaggerated relative to the output period (OP) and the feedback period (FP) for some embodiments of the LIDAR system.

In some instances, the duration of offset period (FSP) is greater than or equal to 0.0%, 0.0.5%, or 1% of the duration of the output period (OP) and/or less than 2%, 5%, or 10% of the duration of the output period (OP) and/or the duration of offset period (FSP) is greater than or equal to 0.0%, 0.1%, or 0.2% of the duration of the feedback period (FP) and/or less than 0.5%, 1%, or 2% of the duration of the feedback period (FP). Additionally or alternately, in some instances, the offset period (FSP) duration is greater than or equal to 0.0 μs, 0.01 μs, or 0.05 μs and/or less than 0.1 μs, 0.5 μs, 1 μs and/or the frequency change rate during the duration of the offset period (FSP) is greater than or equal to 0.1 GHz/μs, 0.5 GHz/μs, or 1 GHz/μs and/or less than 10 GHz/μs, 100 GHz/μs. The value of these variables can be application specific and many applications can use or require one or more variable values that are outside of the given ranges.

Figure 3A:
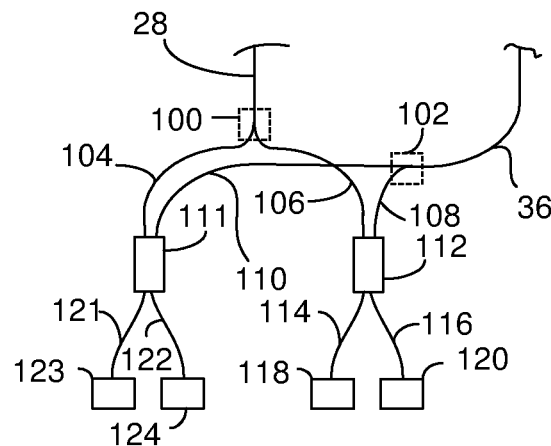
FIG. 3A through FIG. 3C illustrate an example of suitable processing component for use in the above LIDAR systems.
Figure 3B:
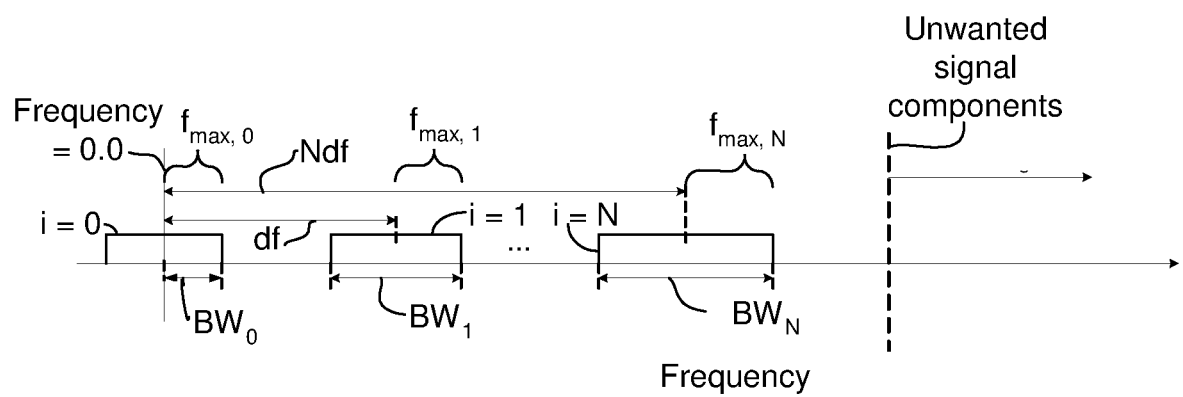

FIG. 3A through FIG. 3B illustrate an example of suitable processing components 34 for use in the LIDAR system of FIG. 1A and FIG. 1B. The processing unit includes a first splitter 102 that divides a reference signal carried on the reference signal waveguide 36 onto a first reference waveguide 110 and a second reference waveguide 108. The first reference waveguide 110 carries a first portion of the reference signal to a light-combining component 111. The second reference waveguide 108 carries a second portion of the reference signal to a second light-combining component 112.

The processing unit includes a second splitter 100 that divides the comparative signal carried on the comparative signal waveguide 28 onto a first comparative waveguide 104 and a second comparative waveguide 106. The first comparative waveguide 104 carries a first portion of the comparative signal to the light-combining component 111. The second comparative waveguide 108 carries a second portion of the comparative signal to the second light-combining component 112.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first light-combining component 111 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 111 also splits the first composite signal onto a first detector waveguide 121 and a second detector waveguide 122.

The first detector waveguide 121 carries a first portion of the first composite signal to a first light sensor 123 that converts the first portion of the second composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 123 and the second light sensor 124 can be connected as a balanced detector and the first auxiliary light sensor 118 and the second auxiliary light sensor 120 can also be connected as a balanced detector. For instance, FIG. 3B provides a schematic of the relationship between the electronics, the first light sensor 123, the second light sensor 124, the first auxiliary light sensor 118, and the second auxiliary light sensor 120. The symbol for a photodiode is used to represent the first light sensor 123, the second light sensor 124, the first auxiliary light sensor 118, and the second auxiliary light sensor 120 but one or more of these sensors can have other constructions. In some instances, all of the components illustrated in the schematic of FIG. 3B are included on the LIDAR chip. In some instances, the components illustrated in the schematic of FIG. 3B are distributed between the LIDAR chip and electronics located off of the LIDAR chip.

The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

As a result of the above channel configurations, the first data signal and the second data signal include unwanted signal components in addition to desired beat signals. However, the values of $\Delta f$ and $df$ can be selected such that $\Delta f > (4N+1)*df/2$ where $N+1$ represents the number of channels for which LIDAR data is to be generated. When $\Delta f > (4N+1)df/2$, the unwanted signal components the first data signal and the second data signal have a frequency above the frequency of the desired beat signals. As a result, filtering can separate the unwanted signal components from the desired beat signals.

FIG. 3B illustrates the relationship between the channels and the frequencies in the first data signal during the feedback period. The desired beat signals associated with different wavelengths appear in separate channels in the frequency domain. The channel associated with wavelength i is centered at the frequency i(df). The maximum frequency for channel i is given by $i(df)+f_{max,\ i}$. Accordingly, the maximum frequency for the channel with the highest frequency (Channel i=N) is equal to $(N)(df)+f_{max,\ N}$. To avoid inter-channel interference, the value of df can be selected such that $df > 2*f_{max,\ N}$.

The value of $f_{max,\ i}$ can be determined from $f_{max,\ i}=f_{dmax}+f_{rmax}=f_{dmax,i}+\tau_{max}*(\alpha_i)$ where $f_{dmax,\ i}$ represents the maximum frequency shift due to the Doppler effect that channel i should experience in the LIDAR input signal and can be approximated as ~$2 \times Vmax \times fc_i/c$ where Vmax represents the maximum in the absolute value of radial velocity level that should be seen by the LIDAR system, c represents speed of light, $f_{rmax}$ represents the max frequency shift due to separation between the source of the LIDAR output signal and the reflecting object, $\alpha_i$ represents the value of a during the data period, and $\tau_{max}$ represents the maximum delay that should occur between transmission of a LIDAR output signal and the receipt of the LIDAR input signal. The values of variables such as $\alpha_i$, $\tau_{max}$, and Vmax can be dependent on the application of the LIDAR system. In general, suitable values include, but are not limited to, $\alpha_i$ greater than 0.1 GHz/µs and less than 10 GHz/µs, $\tau_{max}$ greater than 0.1 µs and less than 2 µs, and Vmax greater than 0.0 m/s and less than 150 m/s. In an example of a self-driving car application, suitable values include, but are not limited to, $\alpha_i$ greater than 0.1 GHz/µs and less than 5 GHz/µs, $\tau_{max}$ greater than 0.7 µs and less than 1.4 us, and Vmax greater than 100 m/s and less than 150 m/s. In an example of an Augmented Reality (AR) application, suitable values include, but are not limited to, $\alpha_i$ greater than 0.1 GHz/µs and less than 1 GHz/µs, $\tau_{max}$ greater than 15 ns and less than 80 µs, and Vmax greater than 0 m/s and less than 0.5 m/s. In some instances, df is greater than 1, 2, or 5 times the value of $2*f_{max,\ N}$.

Although FIG. 3B is disclosed as representing the frequencies in the first data signal, FIG. 3B can also represent the frequencies in the second data signal. Accordingly, the values of $BW_i$ and $f_{max,\ i}$ associated with the first data signal can be the same for the second data signal.

In some instances, the LIDAR data is generated for each of the channels by providing the first data signal to a first Analog-to-Digital Converter (ADC) and the second data signal to a second Analog-to-Digital Converter (ADC). The resulting digital signals can then be provided to a transform module configured to perform a complex transform on a complex signal so as to convert the input from the time domain to the frequency domain. The first data signal can be the real component of the complex signal and the second data signal can be the imaginary component of the complex signal. The transform module can execute the attributed functions using firmware, hardware and software or a combination thereof. The transform converts the input from the time domain to the frequency domain. Accordingly, the transform module can output one or more frequencies the each corresponds to an object in the sample region illuminated by the LIDAR output signal. Each of the different frequencies is used by the electronics as the frequency of the LIDAR input signal. The electronics can use the frequencies for further processing to determine the distance and/or velocity of each of the one or more reflecting objects in the sample region.

One issue with the use of Analog-to-Digital Converters (ADC) on the first data signal and/or on the second data signal may be that the ADC sampling rate required to generate useful results may be impractical to achieve. Another option is to separate the different channels in the first data signal and the second data signal before converting from analog to digital.

Figure 3C:
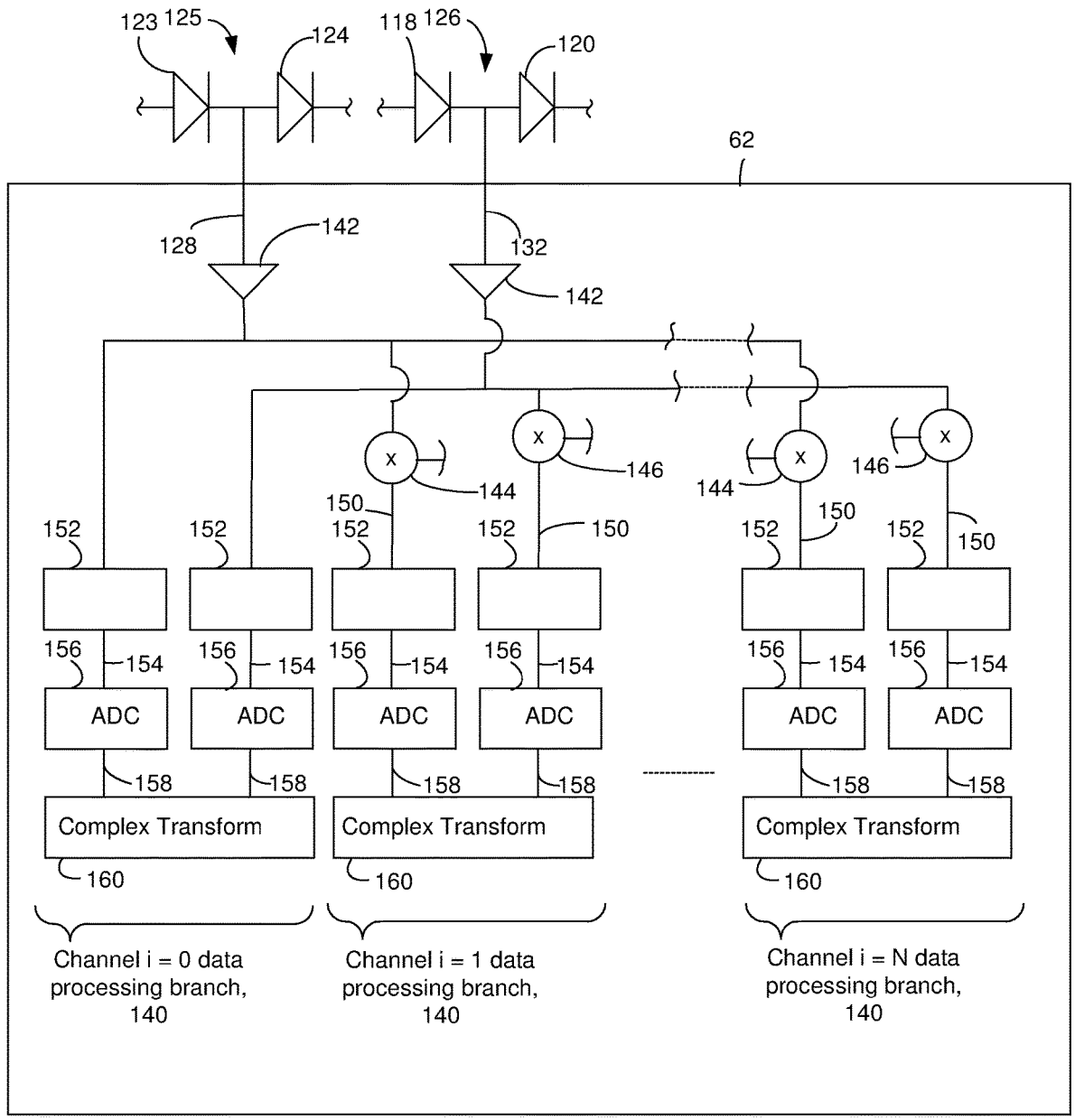

FIG. 3C illustrates a schematic for an example of electronics that are suitable for use with a processing unit constructed according to FIG. 3A. The first data line 128 carries the first data signal to N+1 data processing branches 140 that are each associated with one of the channels. As N becomes larger, it may be desirable to place an optional amplifier 142 along the first data line 128 to amplify to the power of the first data signal to a power level that is sufficient power for processing of the first data signal by the N+1 data processing branches 140. The second data line 132 carries the second data signal to the N+1 data processing branches 140 that are each associated with one of the channels. As N becomes larger, it may be desirable to place an optional amplifier 142 along the second data line 138 to amplify to the power of the second data signal to a power level that is sufficient power for processing of the second data signal by the N+1 data processing branches 140.

In the data processing branches 140 for channels i>0, the first data line 128 carries the first data signal to a first multiplier 144 that multiplies the first data signal by a first multiplier signal. The first multiplier signal is selected to shift the frequencies associated with channel i>0 in the first data signal to a lower frequency. In the example of FIG. 3C, the first multiplier signal is selected to shift the frequencies associated with channel i>0 such that the band $BW_i$ is centered at the zero frequency. Accordingly, the first multiplier signal can be represented by $\cos(2\pi(i)(df)t)$. The first multipliers each outputs a first-frequency shifted data signal. Suitable first multipliers include, but are not limited to, RF mixers such as a Gilbert cell mixer.

In the data processing branches 140 for channels i>0, the second data line 132 carries the second data signal to a second multiplier 146 that multiplies the second data signal by a second multiplier signal. The second multiplier signal is selected to shift the frequencies associated with channels i>0 in the second data signal to a lower frequency. In some instances, the frequencies associated with each channel i>0 in the second data signal are shifted to the same frequency as the associated channel i in the first data signal. In the example of FIG. 3C, the second multiplier signal is selected to shift the frequencies associated with channel i>0 such that the band $BW_i$ is centered at the zero frequency. Accordingly, the second multiplier signal can be represented by $\cos((\pi/2)+2\pi(i)(df)t)$. The second multipliers each outputs a second frequency-shifted data signal. Suitable second multipliers include, but are not limited to, RF mixers such as a Gilbert cell mixer.

The first frequency-shifted data signals and the second frequency-shifted data signals are each received on a filter input line 150 that each carries the received signal to a filter 152. In the above discussions, the frequencies associated with channels i>0 are shifted so as to be centered at a frequency of 0.0. However, the frequencies associated with the channel i=0 in the first data signal are already centered at a frequency of 0.0. As a result, the first data line 128 can carry the first data signal to a filter 152 without the first data signal being processed by a multiplier. Additionally, the frequencies associated with the channel i=0 in the second data signal are already centered a frequency of 0.0. As a result, the second data line 132 carries the second data signal to a filter 152 without the second data signal being processed by a multiplier.

The filters 152 in each data processing branches 140 are configured to pass the frequencies in a frequency band centered at zero-frequency while filtering out other frequency bands. Since the first frequency-shifted data signals in the data processing branch 140 associated with channel i have the frequency band for channel i centered at a zero frequency, each filter 152 outputs a first channel data signal that includes the LIDAR data associated with channel i but does not include or substantially include LIDAR data for the channels below channel i (<i) or above channel i (>i). Since the second frequency-shifted data signals in the data processing branch 140 associated with channel i have the frequency band for channel i centered at a zero frequency, each filter 152 outputs a second channel data signal that includes the LIDAR data associated with channel i but does not include or substantially include LIDAR data for the channels below channel i (<i) or above channel i (>i). Suitable filters for use as the first filters and/or second filters include, but are not limited to, lowpass filters because the first frequency-shifted data signals and the second frequency-shifted data signals are centered at zero-frequency.

The first channel data signals and the second channel data signals are each received on an ADC input line 154 that each carries the received signal to an Analog-to-Digital Converter 156 (ADC). According to the Nyquist sampling theorem, the sampling rate for an Analog-to-Digital Converters (ADC) is generally greater than or equal to twice the highest frequency in the signal. Accordingly, if the frequency arrangement were as shown in FIG. 3B, the sampling rate for channel i would be greater than or equal to $2*(i(df)+f_{max, i})$. In FIG. 3B, the signal i would be considered oversampled when the sampling rate is greater than $2*(i(df)+f_{max, i})$ and undersampled when sampling rate is less than $2*(i(df)+f_{max, i})$. However, because the multipliers reduced the frequency of the channels, the frequency band of the first channel data signals and the second channel data signals are not arranged as shown in FIG. 3B but have been reduced such that the highest frequency for each first channel data signal and each second channel data signal is less than or equal to $f_{max, N}$ in FIG. 3B. Accordingly, the sampling rate for each Analog-to-Digital Converter 156 can be greater than or equal to twice $2*f_{max, N}$. As a result, the down conversion provided by the multiplier reduces the sampling rate required for each Analog-to-Digital Converter 156. The Analog-to-Digital Converters 156 that each receives a first channel data signal outputs a first digital data signal. The Analog-to-Digital Converters 156 that each receives a second data signal outputs a second digital data signal. The first digital data signals and the second digital data signals are each received on a digital data line 158. Each digital data line carries the received signal to a transform module 160.

The transform modules 160 are arranged such that each transform modules 160 receives one of the first digital data signals and the associated second digital data signal. Additionally, each of the transform modules 160 is associated with a different one of the channels. The transform modules 160 associated with channel i receives the first digital data signal for channel i and also receives the second digital data signal for channel i.

The transform modules 160 are configured to perform a complex transform on a complex signal so as to convert the input from the time domain to the frequency domain. The first digital data signal can be the real component of the complex signal and the second digital data signal can be the imaginary component of the complex signal. The transform modules can execute the attributed functions using firmware, hardware and software or a combination thereof.

The Complex Fourier transform converts the input from the time domain to the frequency domain and outputs one or more frequencies the each corresponds to an object in the sample region illuminated by the LIDAR output signal. Different reflecting objects in a sample region need not be physically separate items but can be different surfaces of the same item that are located different distances from the LIDAR system and/or are moving at different radial velocities relative to the LIDAR system as might occur with a jagged object that is both rotating and translating relative to the LIDAR system. Each of the different frequencies is used by the electronics as a frequency for the LIDAR input signal carrying channel i. The electronics can use the frequencies for further processing to determine the distance and/or velocity of each of the one or more reflecting objects in the sample region.

The electronics can use the one or more frequencies output from the transform module for channel i to determine the LIDAR data (the radial velocity and/or the distance between a reflecting object in the sample region and the source of the LIDAR output signal) for each of the one or more objects in the sample region illuminated in channel i. For instance, the following equation applies during a data period where electronics increase the frequency of the outgoing LIDAR signal during the data period such as occurs in data period $DP_1$ of FIG. 2B: $f_{ub}=-f_{d,i}+\alpha\tau_0$ where $f_{ub}$ is the frequency provided by the transform module, $f_{d,i}$ represents the Doppler shift ($f_{d,i}=2vf_{c,i}/c$) where v is the velocity of the reflecting object relative to the chip where the direction from the reflecting object toward the chip is assumed to be the positive direction, and c is the speed of light, $\alpha$ is the rate at which the frequency is changed during the data period, and $\tau_0$ is the roundtrip delay between transmission of a LIDAR output signal and receipt of the corresponding LIDAR input signal. The following equation applies during a sample where electronics decrease the frequency of the outgoing LIDAR signal such as occurs in data period $DP_2$ of FIG. 2B: $f_{db}=-f_{d,i}-\alpha\tau_0$ where $f_{db}$ is a frequency provided by the transform module. In these two equations, $f_{d,i}$ and $\tau_0$ are unknowns. The electronics solve these two equations for the two unknowns. The radial velocity for the sample region then be determined from the Doppler shift ($v=c*f_d/(2f_c)$) and the separation distance for that sample region can be determined from $c*\tau_0/2$. Since the LIDAR data can be generated for each of the frequencies output by the transform, separate LIDAR data can be generated for each of the objects in a sample region. Accordingly, the electronics can determine more than one radial velocity and/or more than one radial separation distance from a single sampling of a single sample region in the field of view.

The data period labeled $DP_3$ in FIG. 2B is optional. As noted above, there are situations where more than one object is present in a sample region. For instance, during the feedback period in $DP_1$ for $cycle_2$ and also during the feedback period in $DP_2$ for $cycle_2$, the transform module for a channel may output more than one frequency. In these circumstances, it may not be clear which frequencies from $DP_2$ correspond to which frequencies from $DP_1$. As a result, it may be unclear which frequencies need to be used together to generate the LIDAR data for an object in the sample region. As a result, there can be a need to identify corresponding frequencies. The identification of corresponding frequencies can performed such that the corresponding frequencies are frequencies from the same reflecting object within a sample region. The data period labeled $DP_3$ can be used to find the corresponding frequencies. LIDAR data can be generated for each pair of corresponding frequencies and is considered and/or processed as the LIDAR data for the different reflecting objects in the sample region.

An example of the identification of corresponding frequencies uses a LIDAR system where the cycles include three data periods ($DP_1$, $DP_2$, and $DP_3$) as shown in FIG. 2B. When there are two objects in a sample region illuminated by the LIDAR outputs signal for channel $\lambda_0$, the transform module that receives the channel $\lambda_0$ outputs two different frequencies for $f_{ub}$: $f_{u1}$ and $f_{u2}$ during $DP_1$ and another two different frequencies for $f_{db}$: $f_{d1}$ and $f_{d2}$ during $DP_2$. In this instance, the possible frequency pairings are: ($f_{d1}$, $f_{u1}$); ($f_{a1}$, $f_{a2}$); ($f_{d2}$, $f_{u1}$); and ($f_{d2}$, $f_{du2}$). A value of $f_d$ and $\tau_0$ can be calculated for each of the possible frequency pairings. Each pair of values for $f_d$ and $\tau_0$ can be substituted into $f_3 = -f_d + \alpha_3 \tau_0$ to generate a theoretical $f_3$ for each of the possible frequency pairings. In this case, the transform modules 136 that receives the channel $\lambda_0$ also outputs two values for $f_3$ that are each treated as an actual $f_3$ value. The frequency pair with a theoretical $f_3$ value closest to each of the actual $f_3$ values is considered a corresponding pair. LIDAR data can be generated for each of the corresponding pairs as described above and is considered and/or processed as the LIDAR data for a different one of the reflecting objects in the sample region.

Each set of corresponding frequencies can be used in the above equations to generate LIDAR data. The generated LIDAR data will be for one of the objects in the sample region. As a result, multiple different LIDAR data values can be generated for a sample region where each of the different LIDAR data values corresponds to a different one of the objects in the sample region.

Figure 3D:
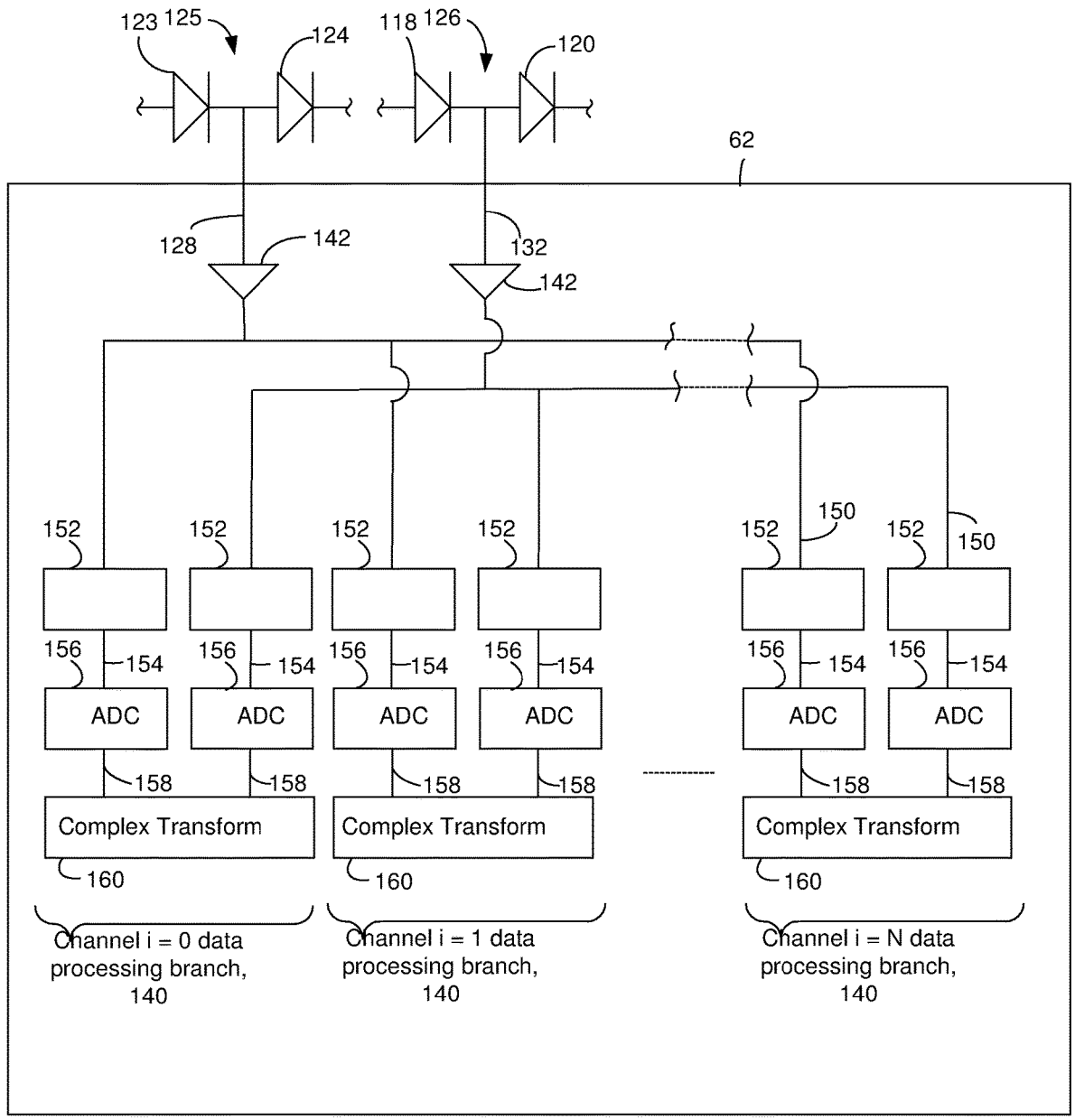
FIG. 3D illustrates a schematic for another example of electronics that are suitable for use with a processing unit constructed according to FIG. 3A.
Figure 4A:
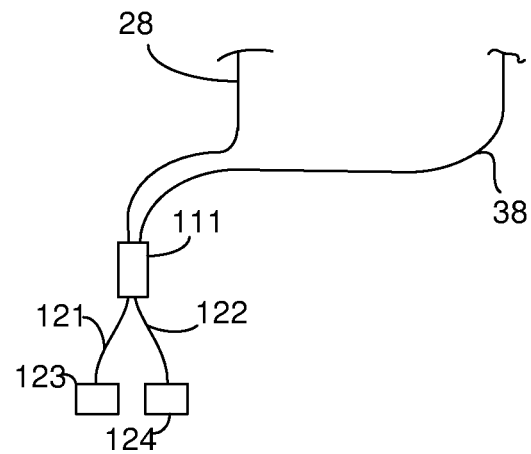
FIG. 4A through FIG. 4C illustrate an example of suitable processing component for use in the above LIDAR systems.
Figure 4B:
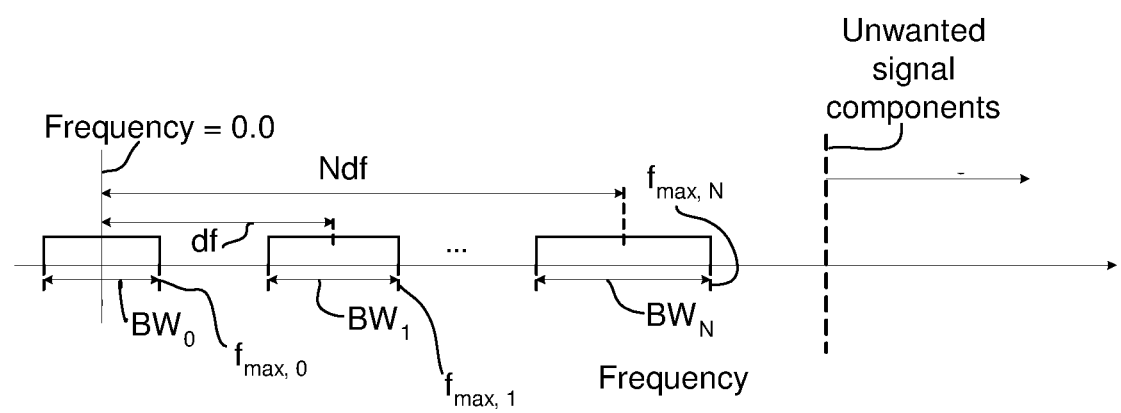
Figure 4C:
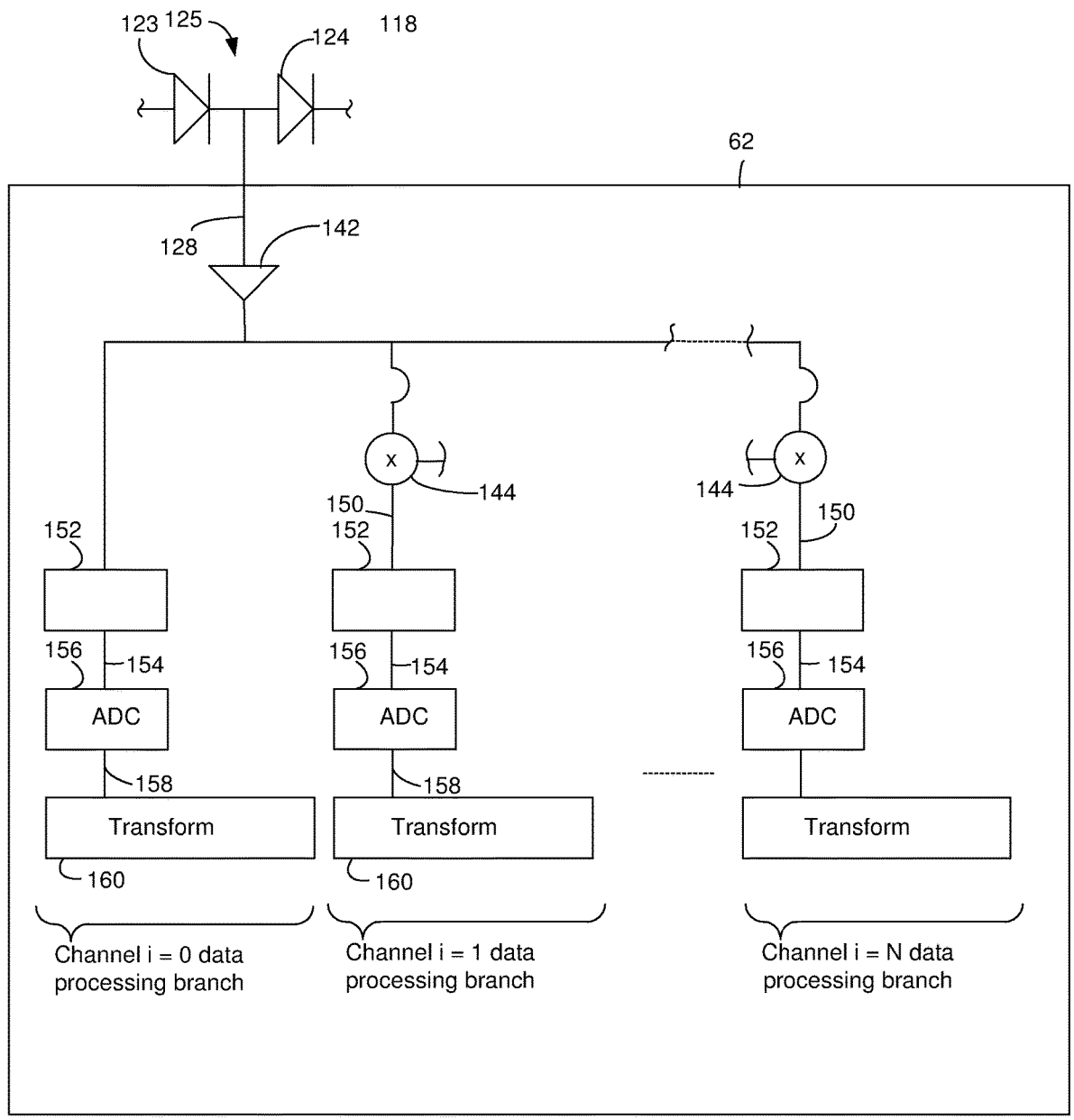
Figure 4D:
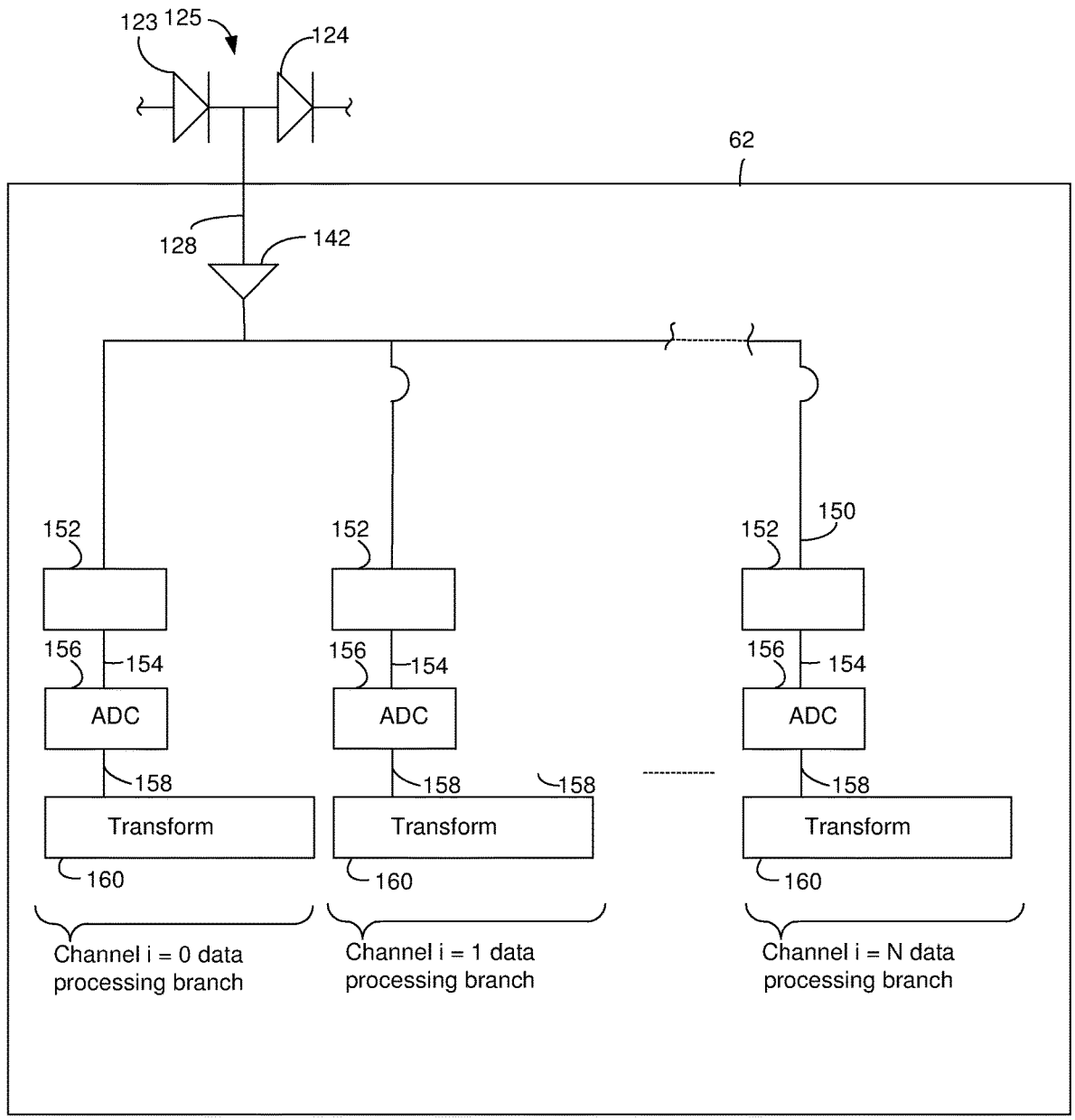
FIG. 4D illustrates a schematic for another example of electronics that are suitable for use with a processing unit constructed according to FIG. 4A.

FIG. 3D illustrates another example of suitable processing components for use in the above LIDAR systems. The first data line 128 carries the first data signal to N+1 data processing branches 140 that are each associated with one of the channels. As N becomes larger, it may be desirable to place an optional amplifier 142 along the first data line 128 to amplify to the power of the first data signal to a power level that is sufficient power for processing of the first data signal by the N+1 data processing branches 140. The second data line 132 carries the second data signal to the N+1 data processing branches 140 that are each associated with one of the channels. As N becomes larger, it may be desirable to place an optional amplifier 142 along the second data line 138 to amplify to the power of the second data signal to a power level that is sufficient power for processing of the second data signal by the N+1 data processing branches 140.

The first data line 128 carries the first data signal to a different filter 152 located in each of the data processing branches 140. Additionally, the second data line 132 carries the second data signal to a different filter 152 located in each of the data processing branches 140. The filters 152 in each data processing branch i are configured to pass the frequencies that fall within bandwidth i ($BW_i$) while filtering out frequencies that fall within bandwidths>i ($BW_{>i}$) and bandwidths<i ($BW_{<i}$). As a result, the filters 152 in data processing branch i that receive a first data signal output a first channel data signal that includes the LIDAR data associated with channel i but does not include or substantially include LIDAR data for the channels below channel i (<i) or above channel i (>i). Additionally, the filter 152 in data processing branch i that receive a second data signal output a second channel data signal that includes the LIDAR data associated with channel i but not include or substantially include LIDAR data for channels below channel i (<i) or above channel i (>i).

Suitable filters 152 for use as the filter 152 in the data processing branch associated with channel i=0 can be a lowpass filter because the frequencies in $BW_1$ are centered around the zero frequency. Suitable filters 152 for use as the filter 152 in the data processing branch associated with channel i>0 can be bandpass filters because the frequencies in $BW_i$ are higher than the zero frequency.

The first channel data signals and the second channel data signals are each received on an ADC input line 154 that each carries the received signal to an Analog-to-Digital Converter 156 (ADC). According to the Nyquist sampling theorem, the sampling rate for an Analog-to-Digital Converters (ADC) is generally greater than or equal to twice the highest frequency in the signal. Accordingly, in FIG. 3B, the signal i would be considered oversampled when the sampling rate is greater than $2*(i(df)+f_{max, i})$ and undersampled when sampling rate is less than $2*(i(df)+f_{max, i})$. In the system of FIG. 3D, at least a portion of the first channel data signals and the second channel data signals are undersampled. For instance, the Analog-to-Digital Converters (ADC) for the first channel data signals and the second channel data signals associated with at least channels i>0 are undersampled. Undersampling the first channel data signal for channel i causes an ADC to output a first digital signal that includes the frequencies of BWi shifted to the zero-frequency. Undersampling the second channel data signal for channel i causes an ADC to output a second digital signal that includes the frequencies of BWi shifted to the zero-frequency.

The undersampling rate can be selected based on the bandwidth of the channel i=N in the first data signal. For instance, the sampling rate for each Analog-to-Digital Converter 156 can be greater than or equal to $f_{max, 0}$ and less than or equal to $f_{max, N}$. As a result, the electronics of FIG. 3D can reduce the required sampling rates to the levels achieved with the down conversion provided by the electronics of FIG. 3C.

The first digital data signals and the second digital data signals are each received on a digital data line 158. Each digital data line carries the received signal to a transform module 160. The transform modules 160 are arranged and operated as disclosed in the FIG. 3A through FIG. 3C to generate LIDAR data for each of the channels.

In some instances, a simplified version of the processing components 34 can be employed. For instance, FIG. 4A through FIG. 4D illustrate simplified processing components 34 that are suitable for use with the above LIDAR systems. The comparative signal carried on the comparative waveguide 28 and the reference signal carried on the reference signal waveguide 36 are carried to a light-combining component 111. The light-combining component 111 operates as disclosed above and outputs the first portion of the first composite signal and the second portion of the first composite signal as disclosed above. The remaining components operate on the first portion of the first composite signal and the second portion of the first composite signal as disclosed in the context of FIG. 3A through FIG. 3D to generate the first digital data signals that are each associated with one of the channels. The first digital data signals are each received on a digital data line 158. Each digital data line carries the received signal to a transform module 160.

The transform modules 160 can perform a real transform on the first digital data signals so as to convert the input from the time domain to the frequency domain. Examples of suitable transforms include a real Fourier transform that converts the input from the time domain to the frequency domain. The transform can output multiple frequency peaks and the electronics can select which frequency peaks to be used as representing the frequency of the LIDAR input signal for comparative channel i. The electronics use the selected frequency for further processing to determine the LIDAR data. The processing components 34 disclosed in the context of FIG. 4A through FIG. 4D are most suitable for use when the source of the LIDAR signal and reflecting object have a radial velocity and radial separation within known ranges and the frequency solutions within those ranges have results that allow the correct frequency solutions to be selected.

Figure 5:
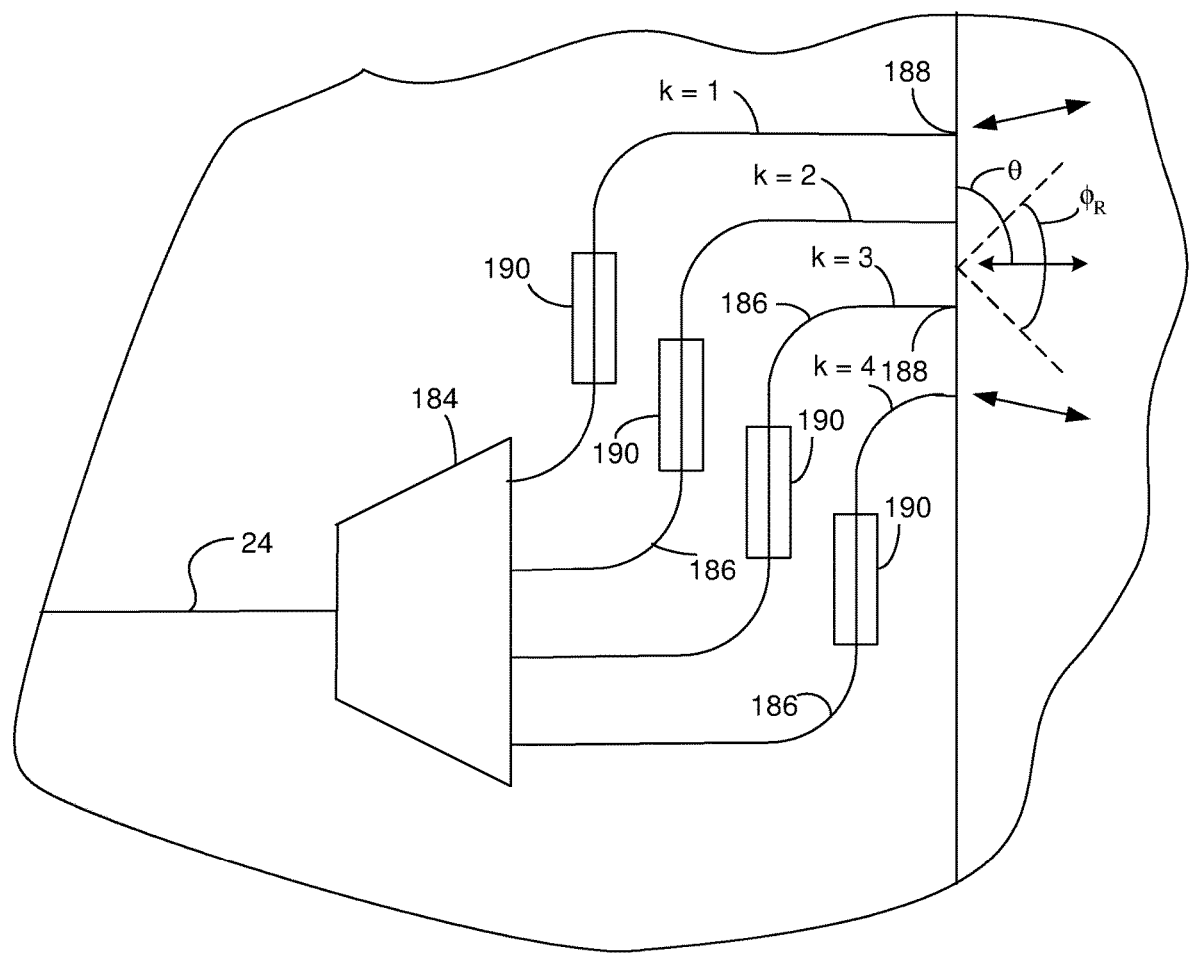
FIG. 5 illustrates an example of a demultiplexing component that includes beam steering capability.

Suitable output components 26 for use in the LIDAR system can be waveguide facets. FIG. 5 illustrates an example of a suitable output component 26 that can optionally include beam steering capability. The demultiplexing component 26 includes a splitter 184 that receives the outgoing light signal from the LIDAR signal waveguide 24. The splitter divides the outgoing light signal into multiple output signals that are each carried on a steering waveguide 186. Each of the steering waveguides ends at a facet 188. The facets are arranged such that the output signals exiting the chip through the facets combine to form the LIDAR output signal.

The splitter and steering waveguides can be constructed such that there is not a phase differential between output signals at the facet of adjacent steering waveguides. For instance, the splitter can be constructed such that each of the output signals is in-phase upon exiting from the splitter and the steering waveguides can each have the same length. Alternately, the splitter and steering waveguides can be constructed such that there is a linearly increasing phase differential between output signals at the facet of adjacent steering waveguides. For instance, the steering waveguides can be constructed such that the phase of steering waveguide number k is $f_o'+(k-1)f^*$ where k is an integer from 1 to K and represents the number associated with a steering waveguide when the steering waveguides are sequentially numbered as shown in FIG. 5, f is the phase differential between neighboring steering waveguides when the phase tuners (discussed below) do not affect the phase differential, and $f_o'$ is the phase of the output signal at the facet of steering waveguide k=1. Because the channels can have different wavelengths, the values of f and $f_o'$ can each be associated with one of the channels. In some instances, this phase differential is achieved by constructing the steering waveguides such that the steering waveguides have a linearly increasing length differential. For instance, the length of steering waveguide k can be represented by $L_o+(k-1)\Delta l$ where $\Delta l$ is the length differential between neighboring steering waveguide, and $L_o$ is the length of steering waveguide k=1. Because $\Delta l$ is a different percent of the wavelength of different channels included in the outgoing LIDAR signal, each of the different LIDAR output signals travels away from LIDAR chip in a different direction (θ). When the steering waveguides are the same length, the value of $\Delta l$ is zero and the value of f is zero. Suitable $\Delta l$ include, but are not limited to, $\Delta l$ greater than 0, or 5 and/or less than 10, or 15 μm. Suitable f include, but are not limited to, f greater than 0π, or 7π and/or less than 15π, or 20π. Suitable K include, but are not limited to, K greater than 10, or 500 and/or less than 1000, or 2000. Suitable splitters include, but are not limited to, star couplers, cascaded Y-junctions and cascaded 1×2 MMI couplers.

A phase tuner 190 can be positioned along at least a portion of the steering waveguides. Although a phase tuner is shown positioned along the first and last steering waveguide, these phase tuners are optional. For instance, the chip need not include a phase tuner on steering waveguide k=1.

The electronics can be configured to operate the phase tuners so as to create a phase differential between the output signals at the facet of adjacent steering waveguides. The electronics can operate the phase tuners such that the phase differential is constant in that it increases linearly across the steering waveguides. For instance, electronics can operate the phase tuners such that the tuner-induced phase of steering waveguide number k is (k−1)ω where ω is the tuner-induced phase differential between neighboring steering waveguides. Accordingly, the phase of steering waveguide number k is $f_o'+(k-1) f^*+(k-1)\omega$. FIG. 5 illustrates the chip having only 4 steering waveguides in order to simplify the illustration, however, the chip can include more steering waveguides. For instance, the chip can include more than 4 steering waveguides, more than 100 steering waveguides, or more than 1000 steering waveguides and/or less than 10000 steering waveguides.

The electronics can be configured to operate the phase tuners so as to tune the value of the phase differential ω. Tuning the value of the phase differential ω changes the direction that the LIDAR output signal travels away from the chip (θ). Accordingly, the electronics can scan the LIDAR output signal by changing the phase differential ω. The range of angles over which the LIDAR output signal can be scanned is $\phi_R$ and, in some instances, extends from $\phi_v$ to $-\phi_v$ with φ=0° being measured in the direction of the LIDAR output signal when ω=0. When the value of $\Delta l$ is not zero, the length differential causes diffraction such that light of different wavelengths travels away from chip in different directions (θ). Accordingly, there may be some spreading of the outgoing LIDAR signal as it travels away from the chip. Further, changing the level of diffraction changes the angle at which the outgoing LIDAR signal travels away from the chip when ω=0°. However, providing the steering waveguides with a length differential ($\Delta l \neq 0$) can simplify the layout of the steering waveguides on the chip.

Suitable electronics can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Additional details about the construction and operation of a demultiplexing component 26 constructed according to FIG. 5 can be found in U.S. Provisional Patent Application Ser. No. 62/680,787, filed on Jun. 5, 2018, and incorporated herein in its entirety.

The above disclosure uses channel assignments that start channel i=0 through channel N for a total of N+1 channels. However, the channel indices can be shifted. For instance, the channel index can be configured such that the channels start at channel j=1 through channel M for a total of M channels. Such a shift can be performed by substituting i=j−1 into the above equations.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of operating a LIDAR system, comprising:
outputting from a light source an outgoing LIDAR signal,
generating multiple composite light signals that each carries at least a signal couple, a signal couple including a reference signal and an associated comparative signal, each signal couple being associated with a different channel,
the comparative signals each including light from the outgoing LIDAR signal that has been reflected by one or more objects located outside of the LIDAR system and the reference signals each including light from the outgoing LIDAR signal but excluding light that has been reflected by any object located outside of the LIDAR system; and
outputting from the LIDAR system LIDAR output signals,
the LIDAR output signals having a frequency versus time pattern that is repeated over sequential cycles,
the comparative signals each including light from a different one of the LIDAR output signals,
each cycle includes multiple data periods and the frequency versus time pattern is the same for corresponding data periods in different cycles,
one or more of the data periods includes an output period and a feedback period, a rate of a frequency change in the LIDAR output signals being the same during the output period and the feedback period of the same data period, and
an offset period being present between the output period and the feedback period in each data period that is included in the one or more data periods, the frequency of the LIDAR output signal changing by a frequency offset during the offset period.

2. The method of claim 1, wherein light included in each reference signal and in the associated comparative signal was generated by the same laser.

3. The method of claim 1, wherein each signal couple has a non-zero frequency differential.

4. The method of claim 3, wherein the frequency offset of each LIDAR output signal is a portion of the frequency differential for the signal couple having the comparative signal that includes light from the LIDAR output signal.

5. The method of claim 4, wherein a portion of the frequency differential is induced by a distance between the LIDAR system and the one or more objects located outside of the LIDAR system.

6. The method of claim 1, wherein for at least a portion of the LIDAR output signals, each cycle includes multiple data periods and each data period includes an offset period between the output period and the feedback period.

7. The method of claim 1, further comprising: generating LIDAR data from composite signals that occur during the feedback periods but not during the output periods, the LIDAR data indicating a distance and/or radial velocity between the LIDAR system and the one or more objects.

8. The method of claim 1, wherein the composite light signals are each generated by a light-combining component configured to combine one of the reference signals with the associated comparative signal.

\* \* \* \* \*